United States Patent [19]

Naoi et al.

[11] Patent Number: 5,479,419
[45] Date of Patent: Dec. 26, 1995

[54] ADAPTIVE MAXIMUM LIKELIHOOD SEQUENCE ESTIMATOR

[75] Inventors: Toshimichi Naoi; Haruhiro Shiino; Yasuo Shoji, all of Tokyo, Japan

[73] Assignee: Oki Electric Industry Co., Ltd., Tokyo, Japan

[21] Appl. No.: 266,771

[22] Filed: Jun. 28, 1994

[30] Foreign Application Priority Data

Jul. 2, 1993 [JP] Japan ................................. 5-164521

[51] Int. Cl.⁶ ......................................................... G06F 11/10
[52] U.S. Cl. ............................. 371/43; 375/229; 375/341
[58] Field of Search ........................... 371/43–45; 375/11, 375/94, 14, 80, 84, 101, 229, 232, 324, 330, 340, 341, 348; 329/304, 306, 310

[56] References Cited

U.S. PATENT DOCUMENTS 5,303,263  4/1994  Shoji et al. ............................... 375/11
5,371,471  12/1994  Chennakeshu et al. ................ 375/14
5,375,129  12/1994  Cooper ..................................... 371/43

OTHER PUBLICATIONS

John G. Proakis, "Digital Communications", McGraw–Hill 1983, pp. 610–643.

Primary Examiner—Roy N. Envall, Jr.
Assistant Examiner—Steven R. Garland
Attorney, Agent, or Firm—Steven M. Rabin; Allen Wood

[57] ABSTRACT

An adaptive maximum likelihood sequence estimator includes a channel estimator and a Viterbi algorithm processor for estimating the maximum likelihood transmission symbol sequences. The algorithm processor includes a branch metric computer in which common components are found from regularity in computations of coded alphabets of the transmission symbols and are used for all branch metric computation to reduce the total amount of the operations. Such effective computations are implemented by either of hardware and software in accordance with the constitution of the system of the adaptive maximum likelihood sequence estimator.

24 Claims, 15 Drawing Sheets

ADAPTIVE MAXIMUM LIKELIHOOD SEQUENCE ESTIMATOR

BACKGROUND OF THE INVENTION

1. Field of the Invention

This invention relates to an adaptive maximum likelihood sequence estimator, used as an equalizer for compensating for distortions on a transmission channel, and constituted of a channel estimator and a Viterbi algorithm processor.

2. Description of Related Art

Digital mobile communications is currently in a period of rapid development In a land mobile communication, distortions on transmission channels need to be compensated by an equalizer, because frequency selective fading may occur due to many interference waves accompanied by delays and due to high speed movements of mobile terminals and may thereby grossly impair received signal waveforms. As a method applied to such an equalizer, a maximum likelihood sequence estimation method is known. The maximum likelihood sequence estimation method is one of the most effective equalizing methods for estimating the correct transmitting symbol sequence from the received signal waveforms which are distorted due to delay characteristics of the transmission channel, as of such frequency selective fading.

Referring to FIGS. 1 to 3, an outline of digital mobile communications is described as follows. In a digital mobile communication system, the time division multiple access (TDMA) method is used to effectively utilize a limited frequency band and to readily connect to the ISDN (Integrated Service Digital Network) service implemented in fixed communication networks.

FIG. 1 shows an example of a frame constitution for the TDMA method. In FIG. 1, one frame is composed of six time-slots Slot1 to Slot6. One or two time-slots are assigned to one user of the system. Each of the time-slots from Slot1 to Slot 6 is constituted of a 28-bit training sequence SYNC for training synchronizers and equalizers, a 12-bit information sequence SACCH for control a 12-bit sequence CDVCC for identifying adjacent channels, 260 bits of data formed on two 103-bit data sequences DATA, and a 12-bit reserved region RSVD.

FIG. 2 shows a block diagram of a transmitting and receiving system of a digital mobile communication handling such a TDMA frame. In this transmitting and receiving system, a receiver 30 is connected to the output of a transmitter 10 through a transmission channel 20. The transmitter 10 includes an encoder 11, a transmission low pass filter (LPF) 12, a modulator 13 and the like. The receiver 30 includes a demodulator 31, a receiving low pass filter (LPF) 32, an equalizer 33, a decoder 34, and the like.

In the transmitter 10, the encoder 11 converts input data $b_m$ (bit sequences in accordance with the TDMA frame constitution) into transmission symbol $x_n$, and the transmission low pass filter 12 produces complex transmission base band signals s(t)by limiting the band of the transmission symbol $x_n$. The modulator 13 modulates the complex transmission base band signals s(t) with a carrier and transmits them as signals sc(t) to the transmission channel 20.

The transmission signals $s_c(t)$ are affected with characteristics of the transmission channel 20, and the affected signals $r_c(t)$ reach the receiver 30. In the receiver 30, the demodulator 31 converts the signals $r_c(t)$ into complex base band signals r(t), which are band-limited by passing through the receiving low pass filter 32 and thereby become received complex base band signals y(t). These signals y(t) are sampled with a symbol interval T and given to the equalizer 33. The equalizer 33 compensates, based on the sampled values $y_n$ of the received signals y(t), the characteristics of the transmission channel 20 due to frequency selective fading, and estimates transmission symbol sequences. Finally, the decoder 34 decodes estimated values $EX_n$ (here, E represents estimation.) of the transmission symbols to obtain transmitted data $Eb_m$.

The π/4-shift differential quadraphase shift keying (DQPSK) method can be used as a modulation method for the encoder 11. In the π/4 shift DQPSK method, binary data sequences $b_m$ composed of 0 and 1 are divided by every two bits, and one of phase differentials −3π/4, −π/4, π/4, 3π/4 is selectively assigned in conjunction with the two bits' combination taking one of the four possible features. Where the assigned phase differential is $\Delta\Phi_n$ (n=1, 2, . . .) and where the absolute phase of the transmission symbol at time n is $\Phi_n$, the absolute phase $\Phi_n$ of the transmission symbol at time n is sought according to a formula (1), and transmission symbols $x_n$ at the time n are yielded by converting, in accordance with a formula (2), the absolute phase $\Phi_n$.

$$\Phi_n = \Phi_{n-1} + \Delta\Phi_n \qquad (1)$$

$$x_n = e^{j\Phi_n} \qquad (2)$$

The input data $b_m$ are thus converted to a point (coded alphabet: any of 0 to 7) on a signal-space diagram (coded alphabet diagram) in FIG. 3, as a descriptive diagram of the π/4 shift DQPSK method. In FIG. 3, white circles represent transmission symbols in odd numbers, and hatched circles represent transmission symbols in even numbers. A phase shift between the time n and the time n+1 becomes any one of −3π/4, −π/4, π/4, and 3π/4. That is, if the time proceeds to the next, the symbol at the next time proceeds from the white circle to any black circle and from the black circle to any white circle.

As described above, many equalizers 33, in which the sampled values $y_n$'s sequences Y={y1, y2, . . . , yN} corresponding to transmission symbols $x_n$ according to such a π/4 shift DQPSK method are given to compensate characteristics of the transmission channel 20 due to the frequency selective fading, are made according to the maximum likelihood sequence estimation method.

A maximum likelihood sequence estimation method described in "Digital Communications," authored by John. G. Proakis, published by McGraw-Hill, in 1983, pp. 548 to 627 is as follows. The maximum likelihood sequence estimation method is for estimating most probable (Likelihood) transmission symbol sequences X={x1, x2, . . . , xN} to realize sampled value sequences Y of received signals while the impulse response h(t) of the transmission channel 20 is known (or, in many situations, is adaptively renewed as described below) when the received signal sequences Y={$y^1$, $y^2$, . . . , $y^N$} are obtained in a finite duration. The maximum likelihood sequence estimate is obtained by seeking, among $2^N$ sequences composed of N symbols, the sequences {$x^1$, $x^2$, . . . , $x^N$} which make an inverse-square of the distance between the sequence and the sampled value sequences Y shown in a formula (3) the largest (accordingly, or making the square of the distance the least).

$$\Sigma |y^k - \Sigma x_m h(t-mT)|^2 \qquad (3)$$

(wherein k is 1 to N; m is a variant indicating time for the sequences; the former Σ is for k=1 to N; the latter Σ is for all m affecting sampled values $y^k$ at time k.)

However, the Viterbi algorithm, well-known as a decoding method for convolutional codes, is applied in order to estimate the most likely transmission symbol sequences X, because it is in fact difficult to compute the formula (3) for all the possible $2^N$ sequences and because the formula (3) contains convolutional operations.

Referring to FIG. 4, which shows a model of the transmission channel 20 in FIG. 2 described above, a principle of the Viterbi algorithm for the maximum likelihood sequence estimate is briefly described. The transmission channel 20 is assumed as a discrete-time channel model, shown in FIG. 4, in which the impulse response is finite. That is, the model of the transmission channel 20 is supposedly constituted of a successive stage of delay devices 40 for delaying only for symbol intervals T, a group of multipliers 41 for multiplying L+1 symbol sequence portions $x_{n-0}, x_{n-1}, \ldots, x_{n-L}$, each of which is different from one another by the symbol interval T corresponding to the length L·T of the impulse response derived from the successive stage, by impulse response components (hereinafter called tap coefficients) $h_0, h_1, \ldots, h_L$ corresponding to the time, an accumulator 42 for achieving the summation of each multiplier's output, and an adder 43 for adding noise $w_n$ of the transmission channel 20 (additive white gaussian noise) to the output of the accumulator. The tap coefficients $h_m$ (m=0, ..., L) are sampled values h(t−jT), which are sampled at the symbol interval T of the impulse response h(t) of the transmission channel 20 including transmitting and receiving low pass filters 12, 32 in FIG. 2.

Where the characteristics of the transmission channel 20 is thus supposed, the above formula (3) is represented by the following formula (4).

$$-\Sigma |y^k - \Sigma x_{k-p} \cdot h_p|^2 \quad (4)$$

(Wherein k is 1 to N; p is 0 to L; the former Σ is for k=1 to N; the latter Σ is for p=0 to L.)

In this formula (4), the summation $J_n$ up to time k=n can be represented by a formula (5) below using the summation $J_{n-1}$ up to the time k=n−1. Here, $J_n$ is an amount in proportion to logarithmic probability of the received signal sequences from k=1 to k=n and is called a path metric. The second term in the right side of the formula (5) is an amount proportional to the logarithmic probability of the state transition described below and is called a branch metric. The summation $\Sigma x_{n-p} h_p$ in the second term in the right side of the equation of the formula (5) is called a branch value specially in this specification.

$$J_n = J_{n-1} - |y_n - \Sigma x_{n-p} h_p|^2 \quad (5)$$

Although this formula (5) shows that a value up to an intermediate time can be computed at every arrival of the sampled values $y_n$ of the received signals with respect to estimated values shown in the formula (3) of $2^N$ symbol sequences that the transmission symbol sequence possibly takes, it is no less than a computation of all of $2^N$ estimated values (path metrics).

In contrast, the Viterbi algorithm, as the sampled values proceed, converges symbol sequences, which is estimated as the transmission symbols from the $2^N$ symbol sequences that the transmission symbol sequence possibly takes, using the estimated values (path metrics) up to the intermediate time, and reduces the amount of the computation. Hereinafter, the convergence will be described.

Since the state of the transmission channel's model as shown in FIG. 4 is by a partial sequence $\{x_{n-1}, x_{n-2}, \ldots, x_{n-L-1}\}$ of the transmission symbol sequences X, the state at time n−1 is expressed by state vector $S_{n-1}$ shown in the formula (6). Accordingly, in the π/4 shift DQPSK method, $4^L$ ways of the transmission channels are possible at a certain time.

$$S_{n-1} = \{x_{n-1}, x_{n-2}, \ldots, x_{n-L-1}\} \quad (6)$$

On the other hand, if a transition from state $S_{n-1}$ at time n−1 to state $S_n$ at time n is considered, the manner of the transition can be four kinds that the symbol $x_n$ can take, because each of the partial sequence $\{x_{n-1}, x_{n-2}, \ldots, x_{n-L-1}\}$ for the state $S_{n-1}$ and the partial sequence $\{x_n, x_{n-1}, \ldots, x_{n-L}\}$ has the symbol $x_n$ as a vector component. Accordingly, a four-way transition from the state $S_{n-1}$ with respect to each of $4^L$ of state $S_n$.

FIG. 5 is a trellis diagram showing such transitions of transmission channel state in conjunction with time. FIG. 5 shows a diagram according to the π/4 shift DQPSK method wherein the L is 1. In FIG. 5, the number of each state at the respective time represents the number of the transmission symbol shown in FIG. 3. The state transition between times is called as a branch, and the route between the states is called a path.

As described above, with respect to each of four possible states at time n in FIG. 5, there are paths (branches) from four states at the just previous time n−1. The Viterbi algorithm computes, at every time n, path metrics $J_n$ in conjunction with four possible paths of each state, according to the formula (5) described above using the path metrics $J_{n-1}$ up to the just previous time, and selects the largest path. This computation remains four branches between successive times, and therefore remains $4^L$ way paths at every time, thereby gradually converging past paths into one path. The estimated values Ex of the transmission symbol sequences X are obtained from a finally converged single path.

An example of constitution shown in FIG. 7 is known as a conventional maximum likelihood sequence estimator (equalizer 33) for achieving the estimated values Ex of the transmission symbol sequences X thus using the Viterbi algorithm. This maximum likelihood sequence estimator is constituted of a Viterbi algorithm processor 50 and a channel estimator 60. The Viterbi algorithm processor 50 is constituted of a branch metric computer 51, an ACS (Add-Compare-Select) portion 52, a path metric memory 53, and a path history memory 54.

The sampled values $y_n$ of received signals are fed to the Viterbi algorithm processor 50 and the channel estimator 60. In the channel estimator 60, the impulse response of the transmission channel is estimated by an adaptive algorithm such as LMS (Least Mean Square) or the like using training sequences (SYNC in FIG. 1) and the sampled values $y_n$ of received singles corresponding to them. After this computation, the channel estimator 60 continues to estimate the impulse response of the transmission channel using the sampled values $y_n$ of received singles and the estimated value EXn of the transmission symbol. The estimated tap coefficients $Eh_p$ (p=0, ..., L: hereinafter, represented simply by $h_p$), which are the impulse response components of the transmission channel, are fed to the Viterbi algorithm processor 50.

In the Viterbi algorithm processor 50, the branch metric computer 51 computes the branch metrics in the second term of the formula (5) from the sampled values $y_n$ of received singles and the tap coefficients $Eh_p$ supplied from the channel estimator 50. The ACS portion 52 obtains surviving paths and their path metrics from the branch metrics and the path metrics $J_n$ up to the time right before (in the first term of the formula (5)) and supplies the surviving paths to the path history memory 54 and the path metrics $J_n$ to the path metric memory 53. The path metric memory 53 supplies the path metrics $J_{n-1}$ to the ACS portion 52. The path history memory 54 supplies a converged surviving path if the surviving paths are converged into one.

The Viterbi algorithm processor 50 thus estimates the transmission symbol sequences X in accordance with the principle described above from the sampled values $y_n$ of received signals and the estimated tap coefficients $h_p$. It is to be noted that, since the impulse response of the transmission channel is adaptively changed, the maximum likelihood estimator shown in FIG. 7 is deemed as an adaptive maximum likelihood sequence estimator.

In general, intersymbol distances are used for the path metrics $J_n$ as of the estimated values for estimating the transmission symbol sequence X, and in the case that the transmission channel's model is the white gaussian transmission channel the Euclidean distance (including its square) has been frequently used as in the described formula (5).

If such path metrics $J_n$ are computed according to the defining formula, however, the computation becomes a larger amount. If the transmission symbol sequences X are estimated in use of software, the processing period of time becomes longer, whereas if the transmission symbol sequences X are estimated in use of hardware, the constitution becomes complex and the processing period becomes longer. For example, if the modulation method is the π/4 shift DQPSK method, the path metric $J_n$ is sought by the formula (5), but it takes so much time to compute the values of the branch metrics corresponding to the second term of the right side of the formula (5) as turned out from the formula (5). In the case of the π/4 shift DQPSK method, the value of the symbols and the impulse response components are complex, so that the operations are more complicated than seen from the formula (5). Similarly, such problems of the operation amount may happen in the case that, as a matter of course, the transmission symbols are estimated in accordance with other modulation methods.

SUMMARY OF THE INVENTION

It is an object of the invention to provide an adaptive maximum likelihood sequence estimator capable of effectively seeking all branch metrics with less computation amount.

The foregoing object is accomplished with an adaptive maximum likelihood sequence estimator including, as a premise, a channel estimator for estimating impulse responses of the transmission channel using partial sequences of the sampled values of the received signals and the estimated value of the partial sequences of the transmission symbols, and a Viterbi algorithm processor successively estimating transmission symbol sequences from the estimated impulse responses of the transmission channel and from the sampled value partial sequences of the received signals and being composed of a branch metric computer, an ACS (adding-comparing-selecting) portion, a path metric memory, and a path history memory. The maximum likelihood sequence estimator computes common elements for operation, and effectively computes, using the common elements, all branch metrics.

The branch metric computer includes, in conjunction with regularity of coded alphabets in association with the transmission symbols, common element operation means for computing common elements for operation that commonly appear at the computation of a plurality of branch values when branch values of all branches for connecting between states are to be computed, branch value producing means for producing all branch values from the sought common elements, and branch metric final operation means for computing all branch metrics from all the sought branch values. In the branch metric computer, after all the branch values are sought once, the common elements for operation are operated in advance to the computation of all the branch metrics. Such computation is performed by either hardware or software.

According to an embodiment of the invention, the modulation method of the transmission symbols can be accompanied by a phase modulation. The common elements for the operation can be one branch value of plural branch combinations whose phase shift amounts are equal to one another. Where one branch value of plural branch combinations whose phase shift amount is equal to one another is found, the branch value of other branches in the same combination is easily sought.

In another aspect of the invention, the branch metric computer includes common element operation means for computing common elements, and branch metric final operation means for computing all branch metrics. The common element operation means computes one or more kinds of common elements for operation appearing at the computation of a plurality of branch metrics when branch metrics of all branches for connecting between states are to be computed. The branch metric final operation means computes all branch metrics from the sought common elements. Where a computation defining formula to achieve the branch metrics is transformed, all branch metrics can be readily found from values of common elements for operation without seeking all branch values.

The common elements can be the size of one branch value of plural branch combinations whose phase shift amounts are equal to one another, the size of sampled values of received signals, and the product of one branch value of plural branch combinations whose phase shift amounts are equal to one another and sampled values of received signals. If the defining formula of the branch metrics defines the branch metric as the squared Euclidean distance, some elements commonly appear in the computations of the size of one branch value of plural branch combinations whose phase shift amounts are equal to one another, the size of sampled values of received signals, and the product of one branch value of plural branch combinations whose phase shift amounts are equal to one another and sampled values of received signals.

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF THE PREFERRED EMBODIMENTS

Figure 4:
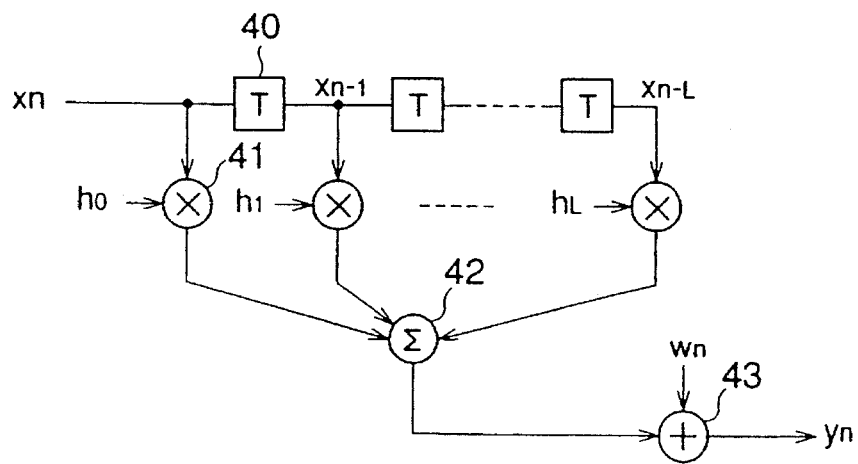
FIG. 4 is a block diagram showing a transmission channel model.

Referring to the drawings in detail, adaptive maximum likelihood sequence estimators for estimating transmission symbols X in accordance with π/4 shift DQPSK coding method according to first to fourth preferred embodiments of the invention are shown. These four embodiments comply with the transmission channel model shown in FIG. 4, in particular, a model with two interference waves whose L is one.

The formula for computing path metrics $J_n$ is given by replacing L by 1 of the formula (5) described above and is expressed by the following formula (7). Those four embodiments are characterized in a computation method of branch metric's values corresponding to the second term, $|y^n - h0 + x_{n-1} h1|^2$, in the formula (7). In particular, the first and second embodiments are characterized in a computation method of the branch values $(x_n h0 + x_{n-1} h1)$. Hereinafter, computations of branch metrics are described in detail in each embodiment. Although the estimated values are used for the tap coefficients, they are represented by h0, h1.

$$J_n = J_{n-1} - |y^n - h0 + x_{n-1} h1|^2 \qquad (7)$$

(I) Basic Common Concept for the First and Second Embodiments

Figure 1:
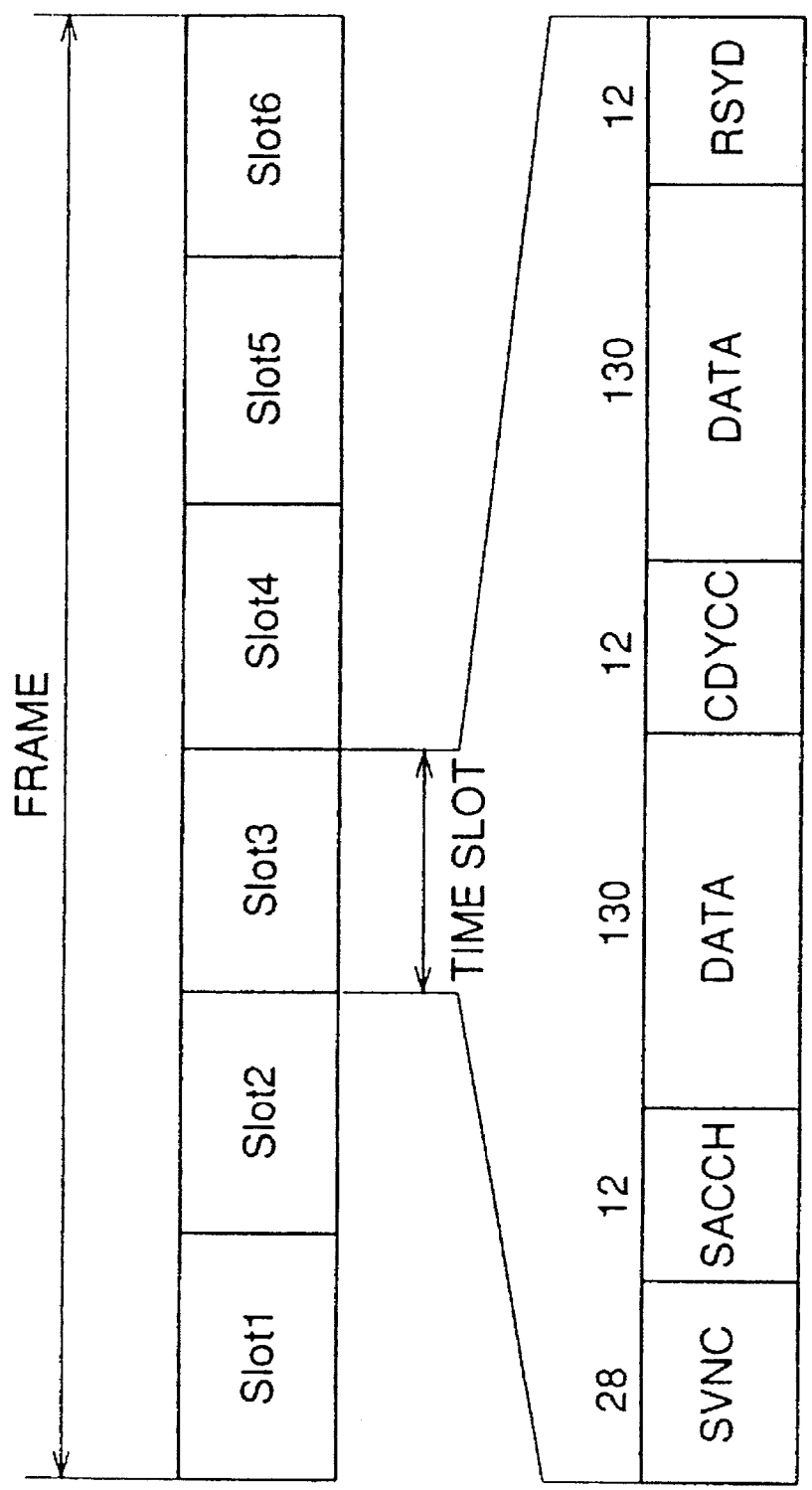
FIG. 1 is a diagram of TDMA frame.
Figure 2:
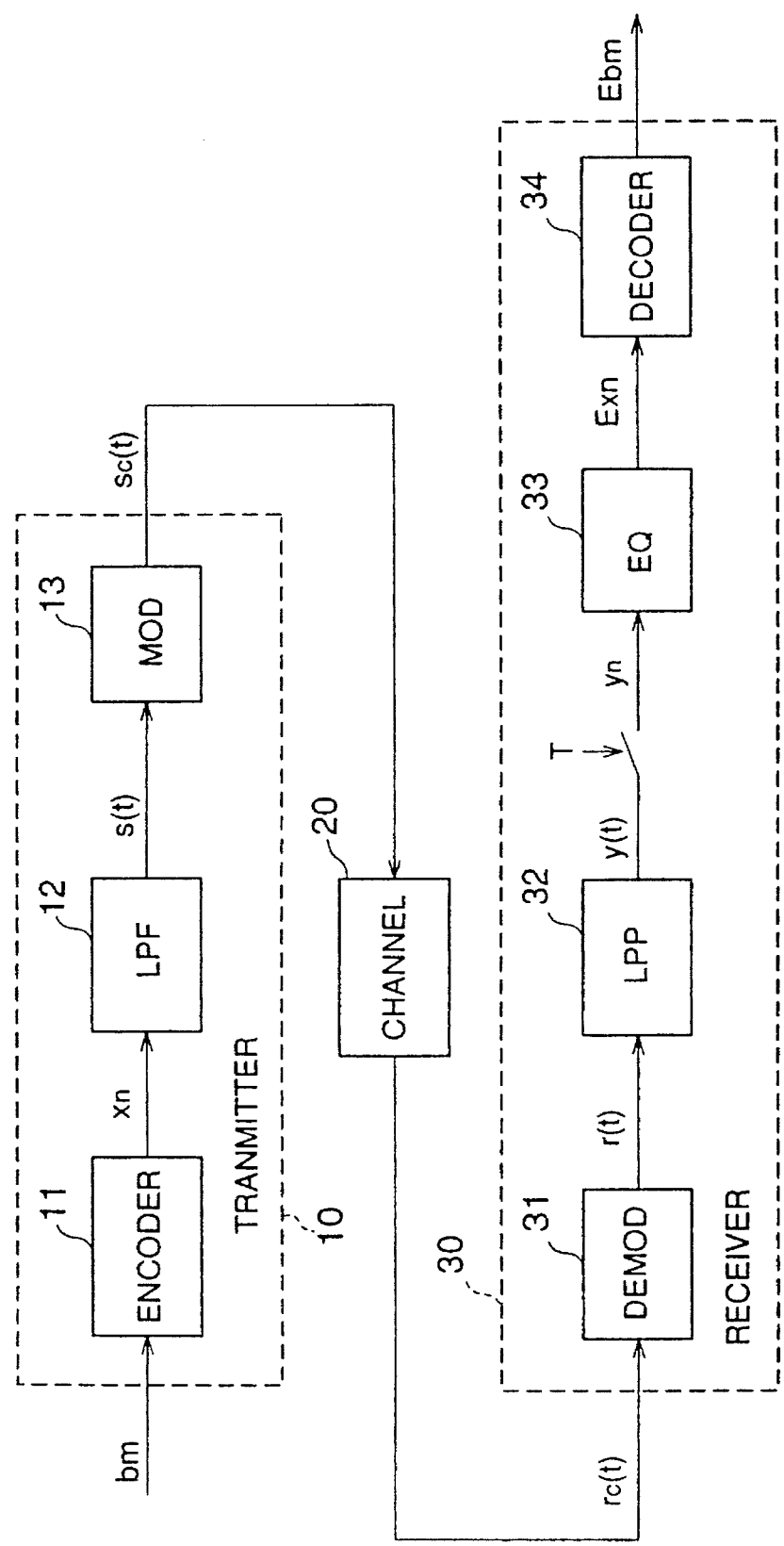
FIG. 2 is a block diagram showing a constitution of a digital radio communication.
Figure 3:
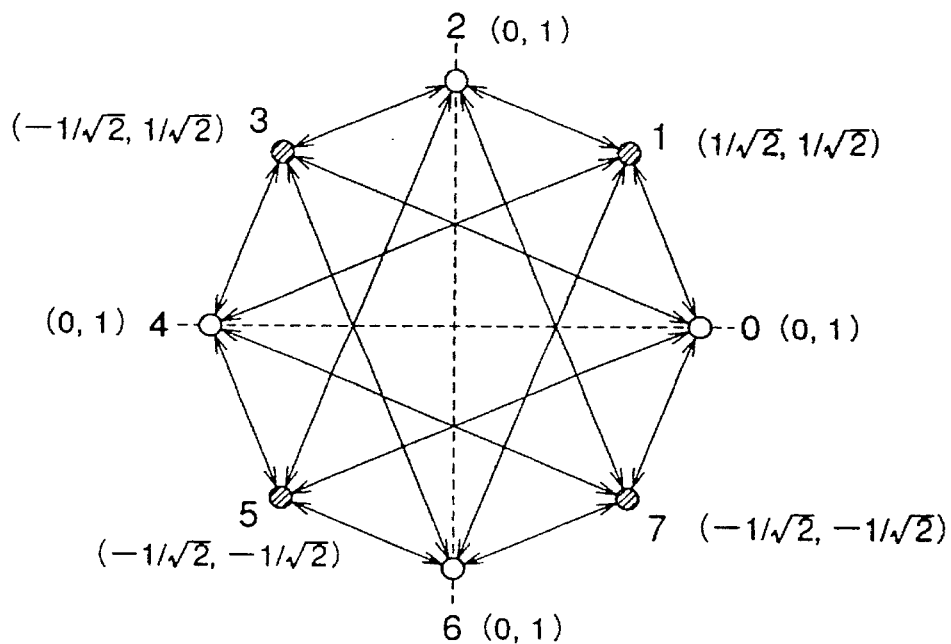
FIG. 3 is a signal-space diagram for the π/4 shift DQPSK method.
Figure 5:
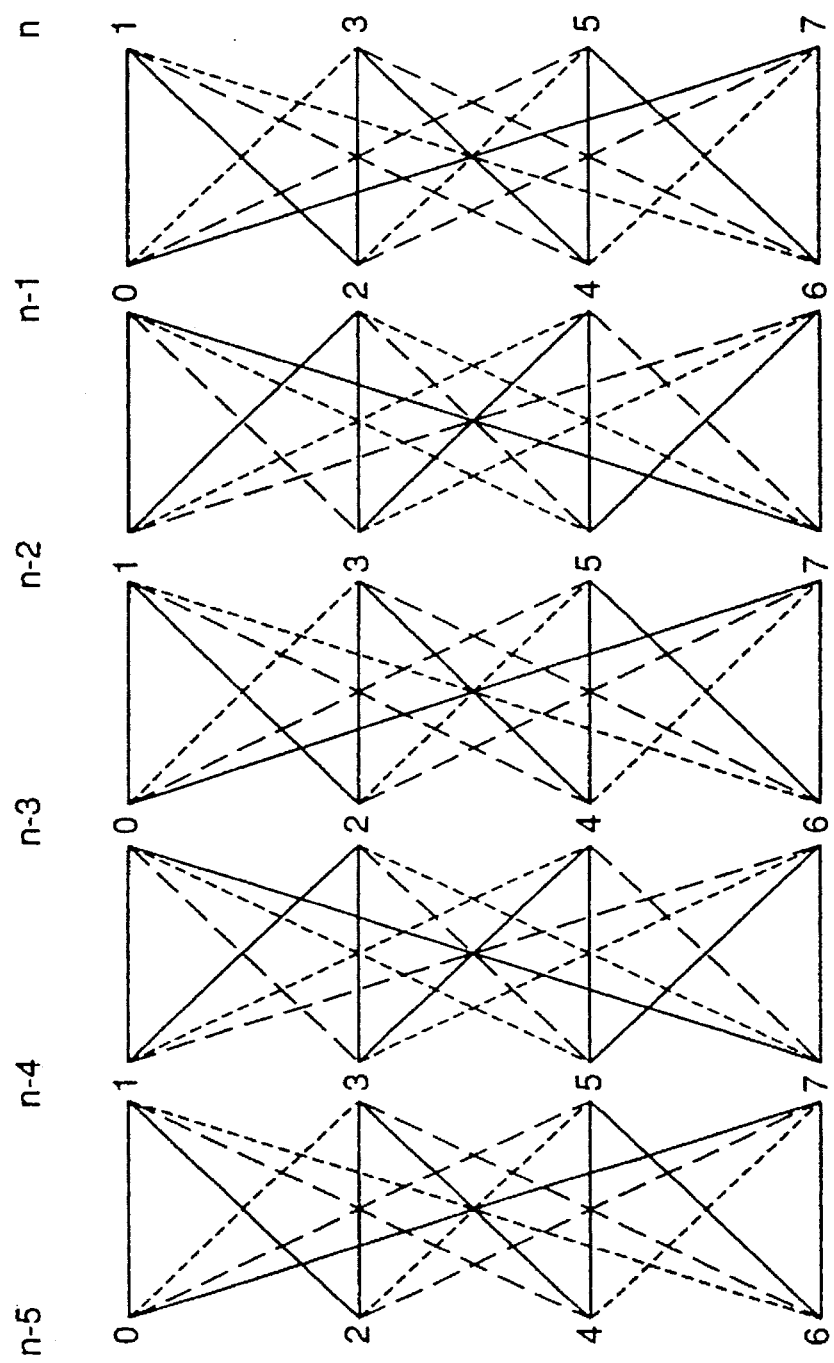
FIG. 5 is a trellis diagram for the π/4 shift DQPSK method.

Transmission symbols according to the π/4 shift. DQPSK modulation method are complied with the signal-space diagram (arrayed diagram of coded alphabets) shown in FIG. 3 and use complex eight kinds of transmission symbols at each symbol interval alternatively by four of them. Thus, at any given time, the transmission symbols are represented by one of four distinct states. Since a two wave model is supposed in these embodiments, its trellis diagram is depicted as FIG. 5, and the state of respective time n can be one of four states corresponding to kinds of the transmission symbols possible at the time. Each symbol P0 to P7 assigned to number 0 to 7 as shown in FIG. 3 is arrayed periodically on a unit circle of the complex plane and represented by complex numbers shown in a following formula (8). It is noted that $\frac{1}{2}^{1/2}$ is expressed by 0.707 and the imaginary unit is expressed by j in the formula (8).

Transmission symbol P0 of the number 0=1;

Transmission symbol P1 of the number 1=0.707+j0.707;

Transmission symbol P2 of the number 2=j;

Transmission symbol P3 of the number 3=−0.707+j0.707;

Transmission symbol P4 of the number 4=−1;

Transmission symbol P5 of the number 5=−0.707−j0.707;

Transmission symbol P6 of the number 6=−j;

Transmission symbol P7 of the number 7=0.707−j0.707 \qquad (8)

If the transmission symbol $x_{n-1}$ at time n−1 is symbol P0 of the number 0, and if the transmission symbol $x_n$ at time n is symbol P1 of the number 1, the branch value b01 corresponding to a transition from the state 0 at time n−1 to the state 1 at time n can be expressed, wherein the tap coefficients (complex) are h0 and h1, by the formula (9).

$$\begin{aligned} b01 &= x_n h0 + x_{n-1} h1 = P0h0 + P1h1 \\ &= 1 \times (h0r + jh0i) + (0.707 + j0.707) \times (h1r + jh1i) \\ &= h0r + 0.707(h1r - h1i) + j\{h0i + 0.707(h1r + h1i)\} \end{aligned} \qquad (9)$$

Furthermore, if the transmission symbol $x_{n-1}$ at time n−1 is symbol P6 of the number 6, and if the transmission symbol $x_n$ at time n is symbol P7 of the number 7, the branch value b67 corresponding to a transition from the state 6 at time n−1 to the state 7 at time n can be expressed, wherein the tap coefficients (complex) are h0 and h1, by the formula (10).

$$\begin{aligned} b67 &= x_n h0 + x_{n-1} h1 = P6h0 + P7h1 \\ &= j \times (h0r + jh0i) + (0.707 - j0.707) \times (h1r + jh1i) \\ &= h0i + 0.707(h1r - h1i) - j\{h0r + 0.707(h1r + h1i)\} \end{aligned} \qquad (10)$$

It is to be noted that in this specification, suffix r is assigned to the real Part the complex number suffix i is assigned to imaginary Part of the complex number; suffixes r and i showing real and imaginary numbers are placed in the last position where plural suffixes are assigned.

It turns out that in a comparison between the formulas (9) and (10), that the real number of the branch value b01 is equal to the inverted imaginary number of the branch value b67 and that the imaginary number of the branch value b01 is equal to the real number of the branch value b67. Although only two kinds of the branch values are explained in the description above, common values or common terms occur in real and imaginary numbers in sixteen kinds of branch values in total transiting from time n−1 to time n. If common terms in absolute value parts are considered, common values are given in four kinds of values A(1) to A(4) shown in a formula (11).

A(1)=0.707 (h1r+h1i)

A(2)=0.707 (h1r−h1i)

$A(3)=h0r$ $A(4)=h0i$ (11)

Although it is explained that sixteen kinds of branch values contain common elements (hereinafter called branch value components when necessary) in transitions of the transmission symbol sequence from the symbol period of an odd number to the symbol period of an even number, sixteen kinds of branch values contain common elements also in transitions of the transmission symbol sequence from the symbol period of an even number to the symbol period of an odd number, and the values can be expressed by a formula (12).

$A(1)=0.707\ (h0r+h0i)$ $A(2)=0.707\ (h0r-h0i)$ $A(3)=h1r$ $A(4)=h1i$ (12)

Accordingly, in other words, the real part bstr and the imaginary part $b_{sti}$ (if s is 0, 2, 4 or 6, then t is 1, 3, 5 or 7; if s is 1, 3, 5 or 7, then t is 0, 2, 4 or 6.) are expressed as a linear combination of those components A(1) to A(4) in the form of $aA_f+bA_g$ where a and b are +1 or −1, and $A_f$ and $A_g$ are different common elements selected from the common elements {$A_t$}, t=1 to 4, using a following formula (13).

| | |
|---|---|
| b01r = A(1) + A(3) | b01i = A(2) + A(4) |
| b03r = −A(2) + A(3) | b03i = A(1) + A(4) |
| b05r = −A(1) + A(3) | b05i = −A(2) + A(4) |
| b07r = A(2) + A(3) | b07i = −A(1) + A(4) |
| b21r = A(1) − A(4) | b21i = A(2) + A(3) |
| b23r = −A(1) − A(4) | b23i = A(1) + A(3) |
| b25r = −A(1) − A(4) | b25i = −A(2) + A(3) |
| b27r = A(2) − A(4) | b27i = −A(1) + A(3) |
| b41r = A(1) − A(3) | b41i = A(2) − A(4) |
| b43r = −A(2) − A(3) | b43i = A(1) − A(4) |
| b45r = −A(1) − A(3) | b45i = −A(2) − A(4) |
| b47r = A(2) − A(3) | b47i = −A(1) − A(4) |
| b61r = A(1) + A(4) | b61i = A(2) − A(3) |
| b63r = −A(2) + A(4) | b63i = A(1) − A(3) |
| b65r = −A(1) + A(4) | b65i = −A(2) − A(3) |
| b67r = A(2) + A(4) | b67i = −A(1) − A(3) . . . (13) |

Here, the branches (states Ss, St before and after the branch represent absolute values of the phase) having the same phase shift amount (phase shift $\Delta\Phi n$ in the formula (1)) are to be checked. Those branches have similar branch values. Therefore, if one branch value is sought, other branch values having the same phase shift amount can be sought by such an operation of exchanging the imaginary number and the real number of the first sought branch value.

For example, in a transition from a symbol period of an odd number to a symbol period of an even number, four branch values b01, b25, b45, b67 having a phase shift amount of $\pi/4$ have relations shown in the following formula (14).

$b01r=A(1)+A(3)=\alpha$ $b01i=A(2)+A(4)=\beta$ $b25r=-A(2)-A(4)=-\beta$ $b25i=A(1)+A(3)=\alpha$ $b45r=-A(1)-A(3)=-\alpha$ $b45i=-A(2)-A(4)=-\beta$ $b67r=A(2)+A(4)=\beta$ $b67i=-A(1)-A(3)=-\alpha$ (14)

For example, where a branch value b01 ($\alpha+j\beta$) is sought, other branch values b25 ($=-\beta+j\alpha$), b45 ($=-\alpha-j\beta$), and b67 ($=\beta-j\alpha$) can be sought using the found branch value ($\alpha$, $\beta$).

As is apparent from the description above, instead of the computation of all sixteen branch values according to the defining formula (7), ($x_n h0 + x_{n-1} h1$), described above, the branch values can be obtained from the following steps f: the branch value components A(1) to A(4) are sought; then, representative branch values ($\alpha$, $\beta$) are sought using the values of the components; other branch values are sought.

The first and second embodiments are accomplished with such a concept, and a branch metric computer (shown in FIG. 7 designated by numeral 51) is different from a conventional one.

(II) First Embodiment

The branch metric computer in the adaptive maximum likelihood sequence estimator according to the first embodiment will be explained. The constitution in the adaptive maximum likelihood sequence estimator according to the first embodiment excluding the branch metric computer can be the same and its description is omitted for the sake of simplicity.

Figure 6:
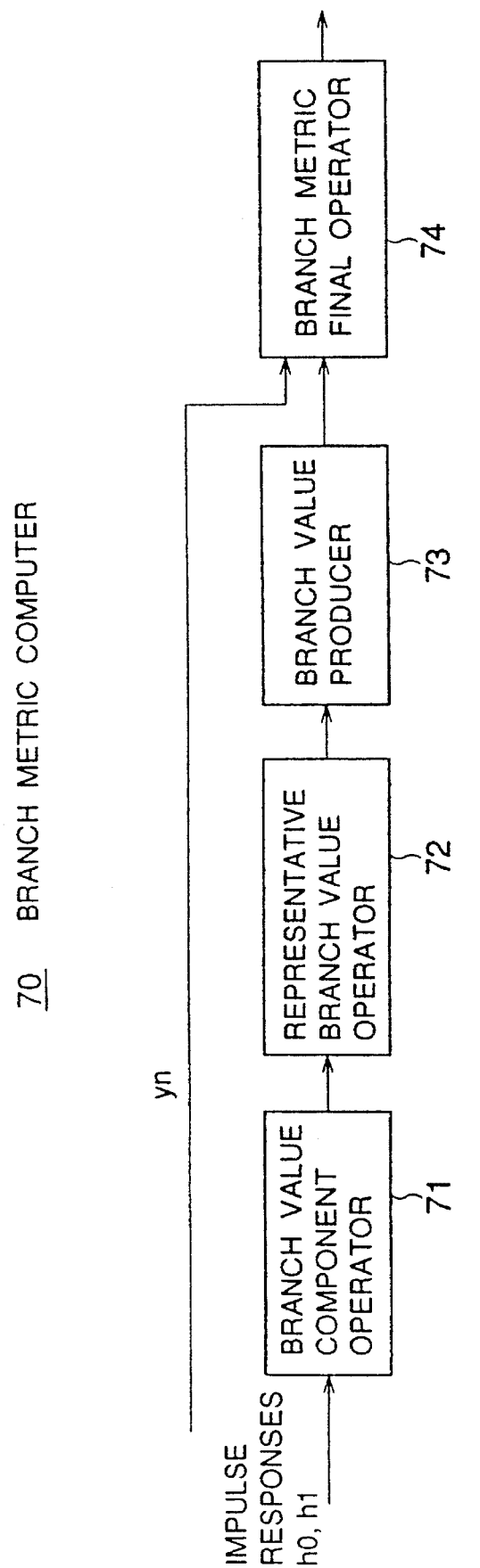
FIG. 6 is a block diagram showing a branch metric computer of an adaptive maximum likelihood sequence estimator according to thea first embodiment of this invention.

FIG. 6 shows a schematic constitution of a branch metric computer 70 according to the first embodiment. The branch metric computer 70 is constituted of hardware using logical devices, and is composed of a branch value component operator 71, a representative branch value operator 72, a branch value producer 73 and a branch metric final operator 74.

Figure 7:
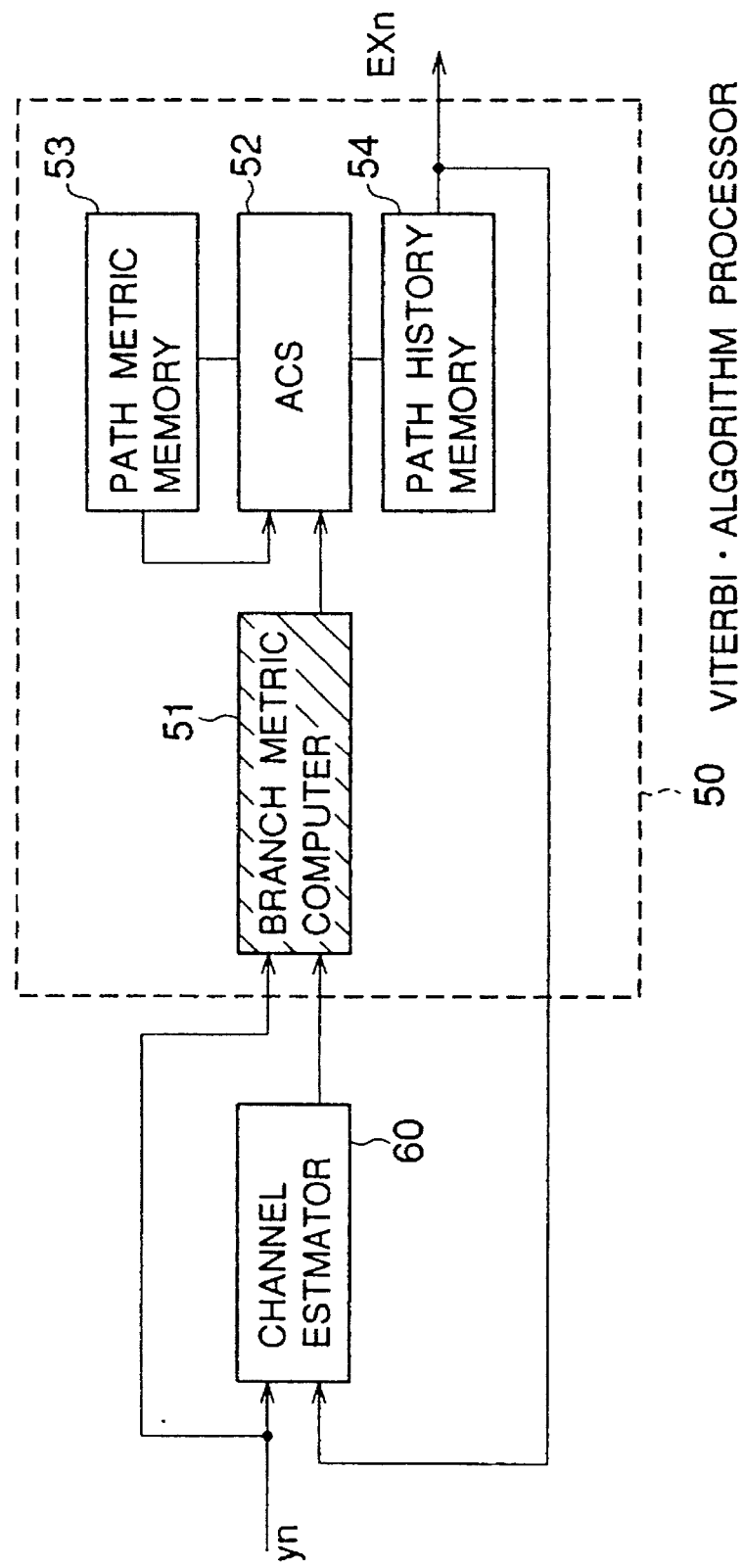
FIG. 7 is a block diagram showing a fundamental structure of a maximum likelihood sequence estimator.

The channel estimator 60 in FIG. 7 gives the tap coefficients h0 (=h0r+jh0i) and h1 (=h1r+jh1i) to the branch value component operator 71. The branch value component operator 71 seeks, using the tap coefficients h0 and h1, components A(1) to A(4) of branch values in accordance with formulas (11) and (12) described above through hardware, and gives them to the representative branch value operator 72.

Figure 8:
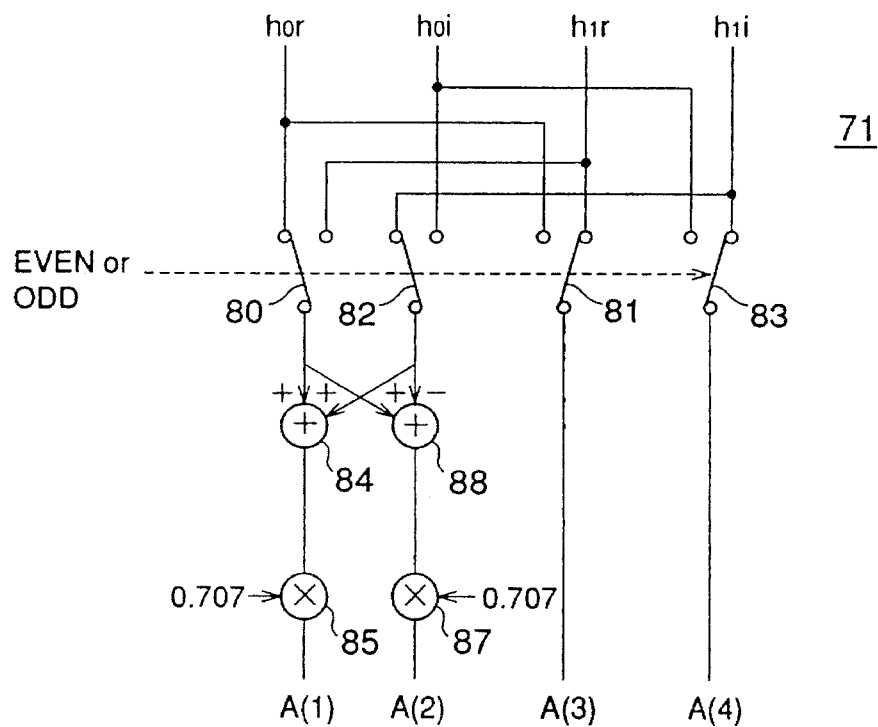
FIG. 8 is a block diagram showing a branch value component operator according to the first embodiment.

FIG. 8 shows an example of the detailed constitution of the branch value component operator 71. It is to be noted that registers on the input and output sides and the like are omitted from FIG. 8. Two selection switches 80, 81 for selecting one of two real numbers h0r, h1r of the tap coefficients and two selection switches 82, 83 for selecting one of two imaginary numbers h0i, h1i of the tap coefficients are provided, and these switches 80 to 83 are switched at once in response to odd-even information of the order in the sequence at time n given from the out side of the operator. These switches 80 to 83 select either the formula (11) or the formula (12) to be applied. The two outputs from the selection switches 80, 82 are added at an adder 84, and a multiplier 85 multiplies its added output by a constant of 0.707 to achieve the component A(1). The subtracter 86 subtracts the output of the selection switch 82 from the output of the selection switch 80, and a multiplier 87 multiplies its subtracted output by a constant of 0.707 to achieve the component A(2). The value selected at the selection switch 81 becomes the component A(3) as it is, and the value selected at the selection switch 83 becomes the component A(4) as it is.

The representative branch value operator 72 supplied with the components A(1) to A(4) seeks through its hardware the real numbers $\alpha 1$ to $\alpha 4$ and the imaginary numbers $\beta 1$ to $\beta 4$ of the representative branch values with respect to each of four combinations composed of four branches having the same phase shift amounts using the components A(1) to A(4), and feeds them to the branch value producer 73.

Now, a transition of the transmission symbol sequences from the symbol period of an odd number to the symbol period of an even number is supposed. The numbers α1 and β1 are the values in association with combinations of the branch values b01, b23, b45, and b67 whose phase shift amount is π/4, and here, the branch value b01 is set as the representative value (shown in the formula (14)). The numbers α2 and β2 are the values in association with combinations of the branch values b03, b25, b47, and b61 whose phase shift amount is 3π/4, and hem, the branch value b03 is set as the representative value. The numbers α3 and β3 are the values in association with combinations of the branch values b05, b27, b41, and b63 whose phase shift amount is −3π/4, and here, the branch value b05 is set as the representative value. The numbers α4 and β4 are the values in association with combinations of the branch values b07, b21, b43, and b65 whose phase shift amount is −π/4, and here, the branch value b07 is set as the representative value.

Figure 9:
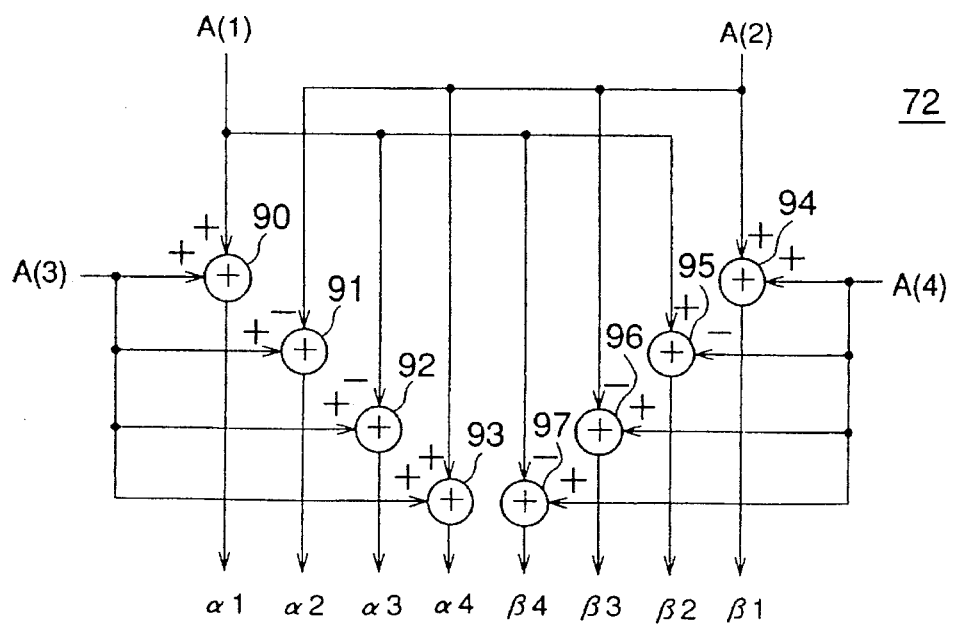
FIG. 9 is a block diagram showing a representative branch value operator according to the first embodiment.

FIG. 9 shows an example of the detailed constitution of the representative branch value operator 72. It is to be noted that registers on the input and output sides and the like are omitted from FIG. 9. The representative branch value operator 72 is constituted of eight adders or subtracters 90 to 97. Each adder or subtracter 90 to 97 yields the real numbers α1 to α4 and the imaginary numbers β1 to β4 of the representative branch values by adding or subtracting the two components. The two components with which each adder or subtracter 90 to 97 adds or subtracts, correspond to the operational formula of the representative branch values in the formula (13).

The branch value producer 73 produces, using relations between branch values as shown in the formula (14) described above, all branch values of the sixteen kinds in total at that time through its hardware, from the four representative branch values (α1, β1), ..., (α4, β4) given as the combination of the real number and the imaginary number, and supplies them to the branch metric final operator 74.

Figure 10:
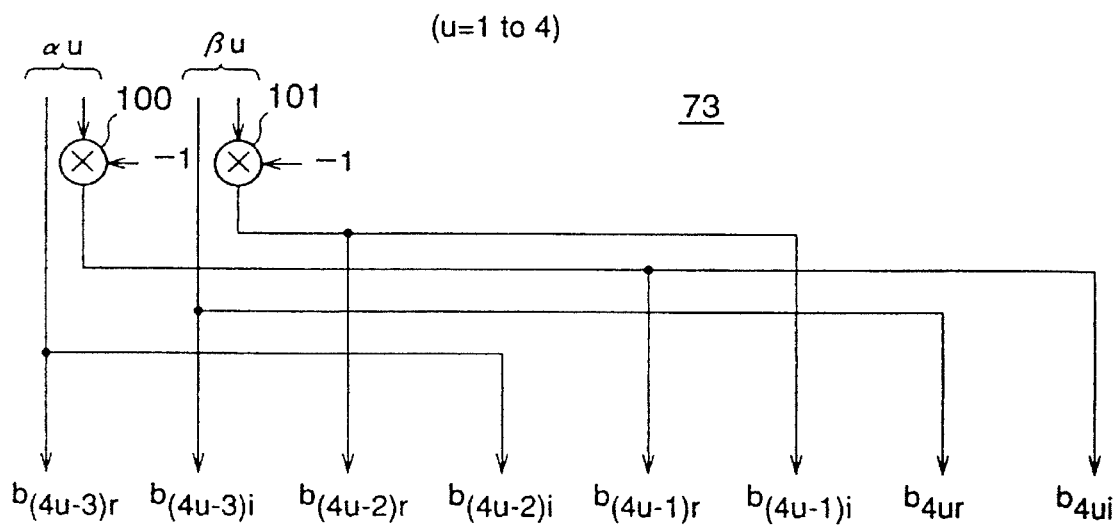
FIG. 10 is a block diagram showing a branch value producer according to the first embodiment.

FIG. 10 shows an example of the detailed constitution of the branch value producer 73 regarding to a certain representative branch value ($\alpha_u$, $\beta_u$) (wherein u is 1 to 4.). It is to be noted that registers on the input and output sides and the like are omitted from FIG. 10. In FIG. 10, the sixteen branch values as shown in the formula (13) described above are expressed as b1 to b16 in the order from the top of the description.

Although the branch value producer 73 is equipped with two inverters 100, 101 as components, it is realized almost by a wiring branch constitution. The representative branch value ($\alpha_u$, $\beta_u$) is supplied as the branch value (b(4u−3)r, b(4u−3)i) of the number of 4u−3 as it is. The value (−βu, αu is supplied as the branch value (b(4u−2)r, b(4u−2)i) of the number 4u−2. The value (−$\alpha_u$, −$\beta_u$) is supplied as the branch value (b(4u−1)r, b(4u−1)i) of the number of 4u−1; the value ($\beta_u$, −$\alpha_u$) is supplied as the branch value (b(4u)r, b(4u)i) of the number of 4u.

The branch metric final operator 74 seeks sixteen branch metrics, through its hardware, by implementing an operation according to the second term of the formula (7) from the sixteen branch values b1 to b16 given by the branch value producer 73 and from the sampled values $y_n$ of the received signal supplied at that time, and if not implemented as to all states supplies the branch metrics to the ACS portion (shown in FIG. 7) as a next stage. It is to be noted that bv (v is 1 to 16) is ($x_n$h0 +$x_{n-1}$h1) in the formula (7).

Figure 11:
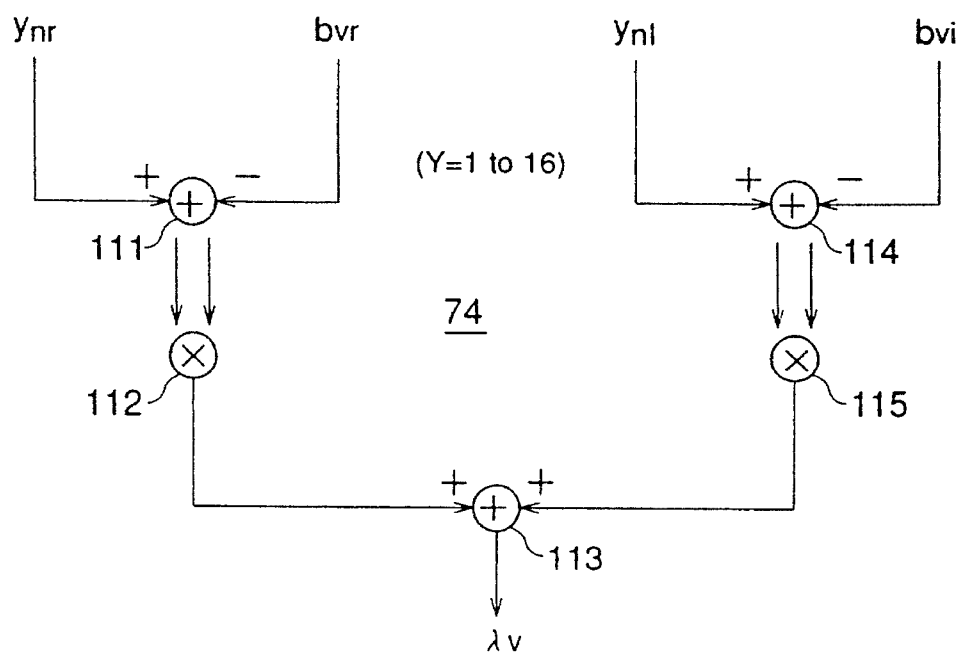
FIG. 11 is a block diagram showing a branch value producer according to the first embodiment.

FIG. 11 shows an example of the detailed constitution of the branch metric final operator 74 regarding a certain branch value (bvr+jbvi). It is to be noted that registers on the input and output sides and the like are omitted also from FIG. 11.

A subtracter 111 subtracts the real number bvr of the branch value from the real number $y_{nr}$ of the sampled value, and a multiplier 112 squares the subtracted output and gives the squared output to an adder 113. A subtracter 114 subtracts the imaginary number bvi of the branch value from the imaginary number $y_{ni}$ of the sampled value, and a multiplier 115 squares the subtracted output and gives the squared output to the adder 113. The adder 113 adds the squared real differential with the squared imaginary differential, and provides a squared Euclidean distance in conduction with complex, or accordingly, provides branch metric λv at its output.

As described above, according to this first embodiment, the operation of the branch metric is not implemented as the defining formula. Since the branch metrics are sought by starting with obtaining the branch value components, the to computation effort is less than that of the conventional computation, thereby simplifying the constitution of the apparatus as well as reducing power consumption.

Next, by comparing the first embodiment with the conventional, up to the step of obtaining the branch value, the effect described above will be proven. The formula defining of the branch value bv is found in the second term of the formula (7) for seeking the branch metrics, and it is expressed as the following formula (15).

$$bv = x_n h0 + x_{n-1} h1 \qquad (15)$$

The defined symbol value $x_n$ and $x_{n-1}$ and the tap coefficients h0 and h1 are complex numbers. Multiplications among complex numbers require, as apparent from the expansion, four multiplications and two additions (for summation of either real numbers or imaginary numbers). Since the definition has two combinations of a multiplication between the complex numbers, and further, since each requires addition of either real numbers or imaginary numbers, eight multiplications and six additions are required to seek one branch value. The branches are sixteen in total, so that 128 multiplications and 96 additions are required to seek all branch values. Accordingly, the multipliers and adders or subtracters are required to be built in compliance with those numbers of computational steps.

In contrast, where the first embodiment is used, only two additions (requiring the use of two adders or subtracters) and two times multiplications (requiring two multipliers) are required as shown in FIG. 8 to obtain branch value components. As shown in FIG. 9, only eight additions requiring eight adders or subtracters) will be enough to calculate the representative branch values. Moreover, as shown in FIG. 10, since two multiplication (requiring two multipliers) per production of the four branches will be enough to produce all branches, eight multiplications will be enough in total. Accordingly, ten multiplications and ten additions are enough as a whole to obtain the branch values in the first embodiment. That is, a method complying with the definition requires 128 times multiplications, whereas the first embodiment requires ten multiplications, and the method complying with the definition requires 96 additions, whereas the first embodiment requires ten additions, so that the differences of those numbers of computational steps bring a simplified constitution and low power consumption.

(III) Second Embodiment

Next, an adaptive maximum likelihood sequence estimator according to the second embodiment will be described. The adaptive maximum likelihood sequence estimator of the second embodiment performs software processing in use of a processor such as a DSP (digital signal processor) or the like.

Figure 12:
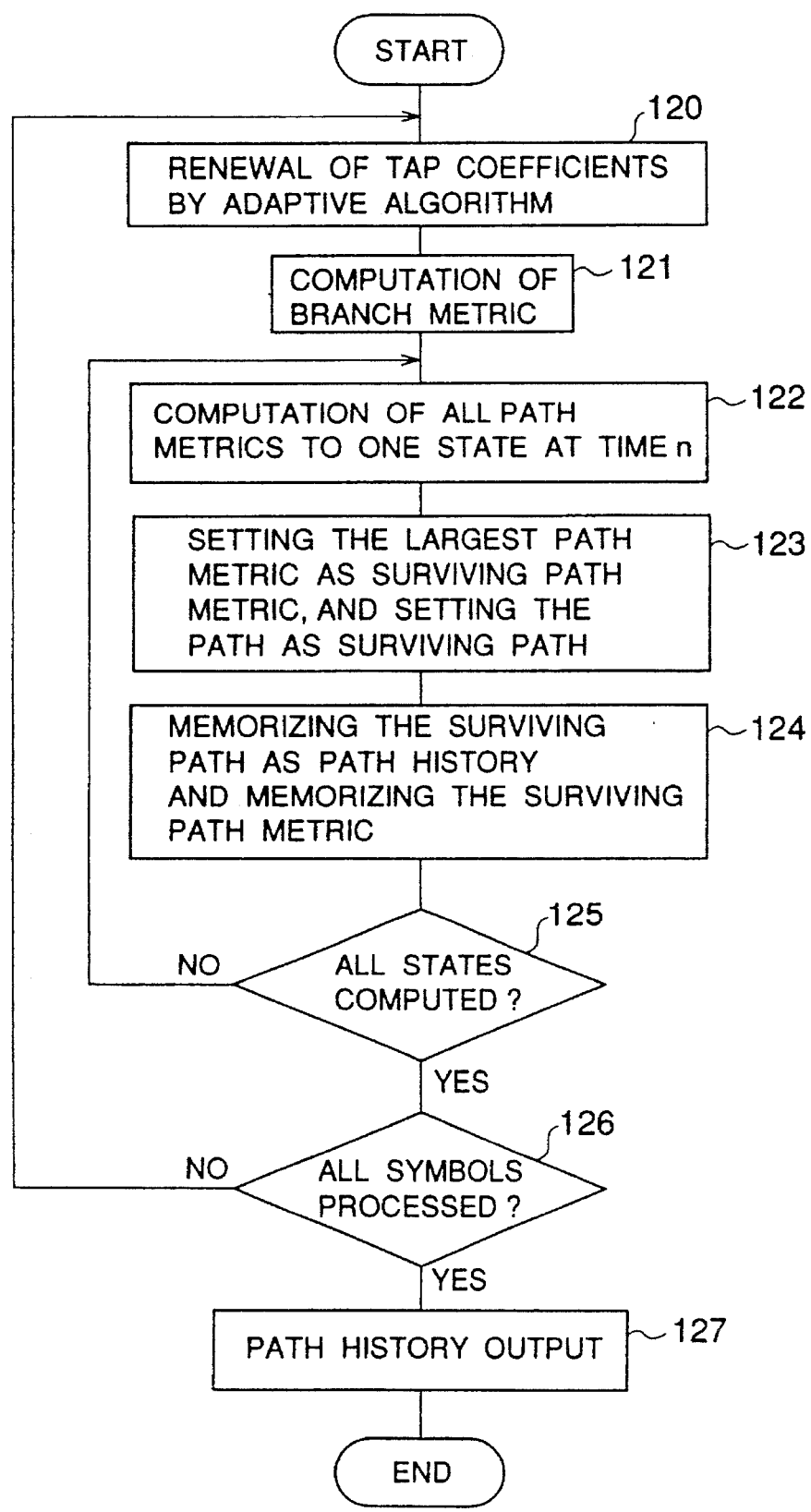
FIG. 12 is a flow chart showing a basic process of the maximum likelihood sequence estimation according to the second embodiment of the invention.

First of all, the entire process to obtain the estimated value of the transmission symbol sequences X is described based on a flow chart in FIG. 12.

At step 120, tap coefficients h0 and h1 are renewed by the adaptive algorithm using the sampled values $y_n$ of the received signals and estimated values $Ex_n$ of the transmission symbols. The branch metrics according to the formula (7) are then calculated from the sampled values $y_n$ of the received signals and from the tap coefficients h0, h1 at step 121.

Regarding one state at time n, all path metrics $J_n$ according to the formula (7) are computed from the branch metrics and path metric value $J_{n-1}$ up to the time just before that time (at step 122). The largest path metric is set as a surviving path metric, and its path is set as a surviving path (at step 123). Then, the surviving path is memorized as path history, and the surviving path metric is memorized (at step 124). Upon confirming whether these processes are implemented as to all states at time n (at step 125), if not implemented as to all states the steps 122 to 124 are repeated for the unprocessed states.

When succeeding processes at time n are finished, it is judged as to whether a process at final time N is finished, namely, whether estimation as to the final symbol is finished (at step 126). If the result is negative, the process returns to the step 120 described above and proceeds to the next time n+1, and in contrast, if the result is positive, the path history is provided at the output and the succeeding processes reach the end (at step 127). This maximum likelihood sequence estimator of the second embodiment is characterized by computation of the branch metrics (in particular, computation of the branch values) at step 121, and processes of the other steps can be the same as the conventional.

Figure 13:
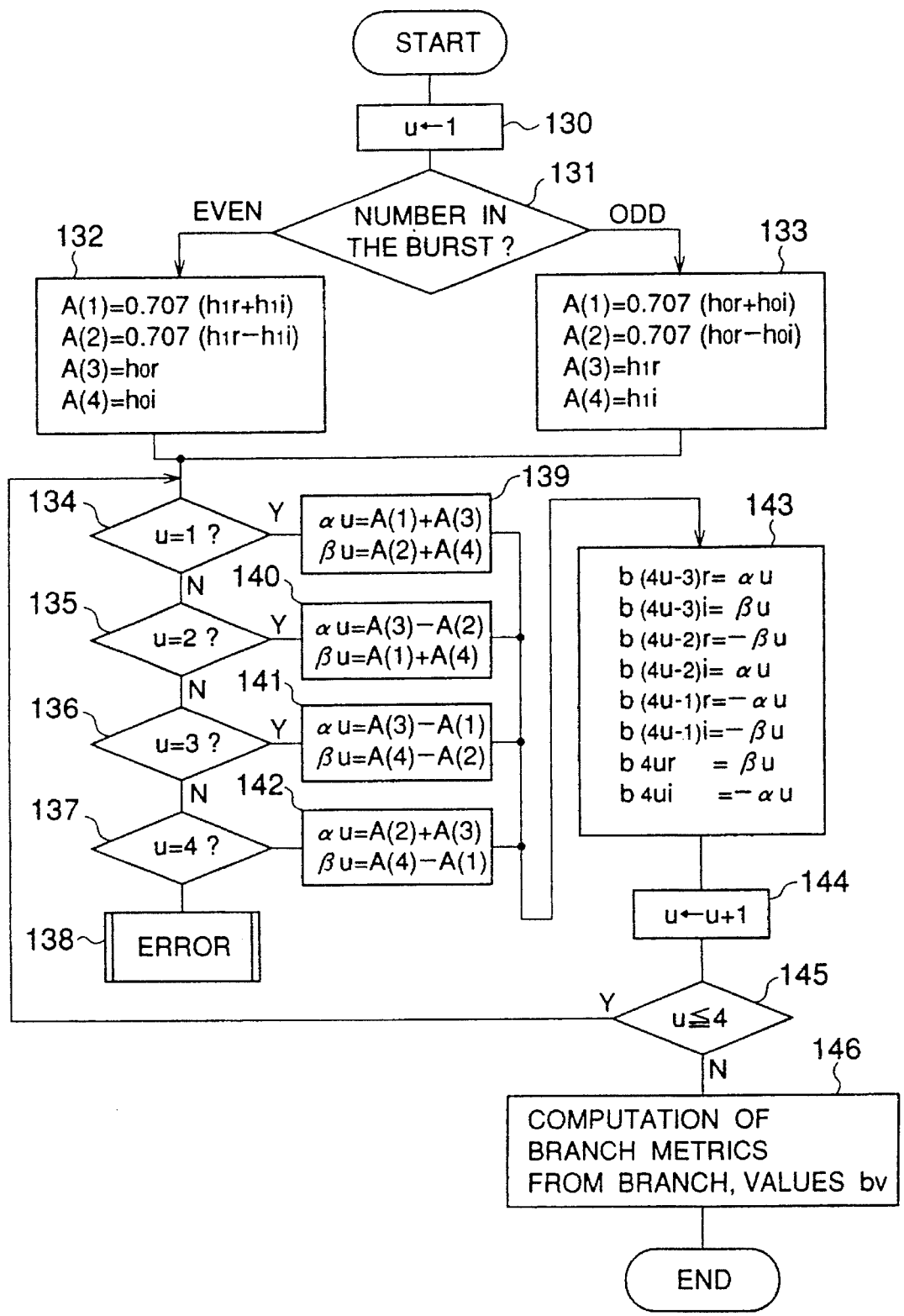
FIG. 13 is a flow chart showing branch metric process of the second embodiment.

Now, referring to FIG. 13, a flow chart, a computation of the branch metric (at step 120) is described in detail. It is to be noted that the second embodiment follows the same concept as the first embodiment.

When entering processes at time n, a phase shift amount parameter u, which determines that the amount of phase shift is one of π/4 (u=1), 3π/4 (u=2), −3π/4 (u=3), and −π/4 (u=4), is set to an initial value of 1 (step 130), and then, it is judged as to whether the time n (symbol to be estimated) is even or odd in the burst (step 131). If it is even, the branch components A(1) to A(4) are computed using the tap coefficients h0, h1 in accordance with the formula (11) (step 132), and if it is odd, the branch components A(1) to A(4) are computed using the tap coefficients h0, h1 in accordance with the formula (12) (step 133).

A judgment of the value of the phase shift amount parameter u at that time is then made at steps 134 to 137. If the phase shift amount parameter u is the incorrect value, an error process is implemented (at step 138).

If the phase shift amount parameter u is 1, the real number $\alpha_u$ of the representative branch value is set to A(1)+A(3), and the imaginary number $\beta_u$ of the representative branch value is set to A(2)+A(4) at step 139. If the phase shift amount parameter u is 2, the real number $\alpha_u$ of the representative branch value is set to A(3)−A(2), and the imaginary number $\beta_u$ of the representative branch value is set to A(1)+A(4) at step 140. If the phase shift amount parameter u is 3, the real number $\alpha_u$ of the representative branch value is set to A(3)−A(1), and the imaginary number $\beta_u$ of the representative branch value is set to A(4)−A(2) at step 141. If the phase shift amount parameter u is 4, the real number $\alpha_u$ of the representative branch value is set to A(2)+A(3), and the imaginary number $\beta_u$ of the representative branch value is set to A(4)−A(1) at step 142.

The transitions of the transmission symbol sequences from an odd symbol period to an even symbol period are exemplified by the following: the branch value b01 is represented where the phase shift amount is π/4 (u=1); the branch value b03 is represented where the phase shift amount is 3π/4 (u=2); the branch value b05 is represented where the phase shift amount is −3π/4 (u=3); the branch value b07 is represented where the phase shift amount is −π/4 (u=4).

When the real number $\alpha_u$ and the imaginary number $\beta_u$ of the representative branch value corresponding to the phase shift amount parameter u at that time is thus obtained, all branch values corresponding to the phase shift amount determined by the phase shift amount parameter u are computed at step 143. In the description of step 143 in FIG. 13, sixteen branch values as shown in the formula (16) described above are expressed in the order arranged from the top.

Although the second embodiment seeks the values in use of the software, the operation itself is the same as the first embodiment (see FIG. 10). That is, the representative branch value (αu, βu) is, as it is, set to the branch value (b(4u−3)r, b(4u−3)i) of the 4u−3 number; the value (−βu, αu) is set to the branch value (b(4u−2)r, b(4u−2)i) of the 4u−2 number; the value (−αu, −βu) is set to the branch value (b(4u−1)r, b(4u−1)i) of the 4u−1 number; the representative branch value (βu, −αu) is set to the branch value (b(4u)r, b(4u)i) of the 4u number.

Where all four branch values corresponding to the phase shift amount determined by the phase shift amount parameter at that time are found, after an increment by one of the phase shift amount parameter u (step 144), the phase shift amount parameter u is compared with 4, the possible largest number, and thereby it is confirmed whether all branch values are computed (step 145). If the computation has not been completed yet, the process returns to step 134 as described above. If the computation has already finished, the branch metrics are computed from the branch value and the sampled values yn of the received signals at that time, and the obtained sixteen branch metrics are transferred to the process at step 122 in FIG. 12 to end the successive processes (step 146).

There are the same relations of times as described in the first embodiment between the number of additions and multiplications of the second embodiment and the number of additions and multiplications of the conventional one performing software processing. Accordingly, the second embodiment can reduce the amount of operations in comparison with the conventional and grossly shorten the processing time for seeking the branch metrics in comparison with the conventional.

(IV) Common Basic Concept for the Third and Fourth Embodiments

A common basic concept for the third and fourth embodiments will be described before the third and fourth embodiments are described. As described above, the third and fourth embodiments are to comply with the transmission channel model shown in FIG. 4, in particular, a model with two interference waves whose L is one.

The first and second embodiments described above enable effective implementation of the computation of the branch metrics, advantageously using that the transmission symbols (their absolute phases) are periodically arrayed on a signal-space diagram (coded alphabet diagram.). Similarly, the third and fourth embodiments enable effective implement of the computation of the branch metrics, advantageously using that the transmission symbols (their absolute phases) are periodically arrayed on a signal-space diagram. However, there is a difference where the first and second embodiments use regularity even in the computation of the branch values, whereas the third and fourth embodiments use regularity of entire computation of the branch metrics.

As described above, all branch values are expressed by the real numbers $\alpha 1$ to $\alpha 4$ and the imaginary numbers $\beta 1$ to $\beta 4$ of the representative branch values indicated in the formula (16) for the branches having the same phase shift amount. The following formula (17) expresses, regarding to the transition from the symbol period of an odd number to the symbol period of an even number, each branch value bst (or as another expression by) by the real and imaginary numbers of the representative branch values. It is to be noted that $\alpha 1$ to $\alpha 4$ and $\beta 1$ to $\beta 4$ are the representative branch values used in the description for the first and second embodiments.

$$\begin{aligned}
&\alpha 1 = h0r + 0.707 \cdot (h1r - h1i)\\
&\beta 1 = h0i + 0.707 \cdot (h1r + h1i)\\
&\alpha 2 = h0r - 0.707 \cdot (h1r + h1i)\\
&\beta 2 = h0i + 0.707 \cdot (h1r - h1i)\\
&\alpha 3 = h0r - 0.707 \cdot (h1r - h1i)\\
&\beta 3 = h01 - 0.707 \cdot (h1r + h1i)\\
&\alpha 4 = h0r + 0.707 \cdot (h1r + h1i)\\
&\beta 4 = h01 - 0.707 \cdot (h1r - h1i) \quad \ldots (16)\\
&b01r = b1r = \alpha 1 \qquad b01i = b1i = \beta 1\\
&b03r = b2r = \alpha 2 \qquad b03i = b2i = \beta 2\\
&b05r = b3r = \alpha 3 \qquad b05i = b3i = \beta 3\\
&b07r = b4r = \alpha 4 \qquad b07i = b4i = \beta 4\\
&b21r = b5r = -\beta 4 \qquad b21i = b5i = \alpha 4\\
&b23r = b6r = -\beta 1 \qquad b23i = b6i = \alpha 1\\
&b25r = b7r = -\beta 2 \qquad b25i = b7i = \alpha 2\\
&b27r = b8r = -\beta 3 \qquad b27i = b8i = \alpha 3\\
&b41r = b94 = -\alpha 3 \qquad b41i = b9i = -\beta 3\\
&b43r = b10r = -\alpha 4 \qquad b43i = b10i = -\beta 4\\
&b45r = b11r = -\alpha 1 \qquad b45i = b11i = -\beta 1\\
&b47r = b12r = -\alpha 2 \qquad b47i = b12i = -\beta 2\\
&b61r = b13r = \beta 2 \qquad b61i = b13i = -\alpha 2\\
&b63r = b14r = \beta 3 \qquad b63i = b14i = -\alpha 3\\
&b65r = b15r = \beta 4 \qquad b65i = b15i = -\alpha 4\\
&b67r = b16r = \beta 1 \qquad b67i = b16i = -\alpha 1 \ldots (17)
\end{aligned}$$

Sixteen branch metrics $\lambda v$ (v is 1 to 16) can be expressed by the following formula (18) in use of the branch values bv ($=x_n h0+x_{n-1} h1$) as such complex numbers and of the sampled values yn, as complex numbers, of the received signals (see the formula (7)).

$$\lambda v = (yn-bv)^2 = (ynr-bvr)^2 + (yni-bvi)^2 \qquad (18)$$

If this formula (18) is expanded, it can be transformed to the following formula (19).

$$\begin{aligned}
\lambda v &= (ynr)^2 + (bvr)^2 + (yni)^2 + (bvi)^2 -\\
&\quad 2(ynr)(bvr) - 2(yni)(bvi)\\
&= (ynr)^2 + (bvr)^2 + (yni)^2 + (bvi)^2 -\\
&\quad 2\{(ynr)(bvr) + (yni)(bvi)\}
\end{aligned} \qquad (19)$$

From this formula (19), the branch metrics $\lambda v$ are, as shown in a formula (20) below obtained by addition or subtraction of a value B shown in the formula (21) and determined only by the sampled value $y_n$ of the received signal of a value C shown in the formula (21) and determined only by the branch value bv, and a value C shown in the formula (21) and determined by both yn and bv.

$$\lambda v = B+C-D \qquad (20)$$

$$B=(ynr)^2+(yni)^2$$

$$C=(bvr)^2+(bvi)^2$$

$$D=2\{(ynr)(bvr)+(yni)(bvi)\} \qquad (21)$$

Here, the sampled values $y_n$ of the received signals are the same in regard to the sixteen branch metrics $\lambda 1$ to $\lambda 16$, and the branch values b1 to b16 have the regularity as described above. Therefore, the components B, C, D of the branch metrics are limited to the following kinds in use of such facts.

The component B of the branch metrics is a summation of the squared real number ynr and the squared imaginary number yni of the sampled values yn of the received signals (accordingly, expressing the size of the sampled values yn); it is common for all sixteen branch metrics $\lambda 1$ to $\lambda 16$; and its value is only one kind according to the formula (21).

The component C of the branch metrics is a summation of the squared real number bvr and the squared imaginary number bvi of the branch values bv (accordingly, expressing the size of the branch values by), and the component C at the sixteen branch metrics $\lambda 1$ to $\lambda 16$ is classified into four kinds shown in the following formula (22), which uses the representative branch values.

$$C1=(\alpha 1)^2+(\beta 1)^2$$

$$C2=(\alpha 2)^2+(\beta 2)^2$$

$$C3=(\alpha 3)^2+(\beta 3)^2$$

$$C4=(\alpha 4)^2+(\beta 4)^2 \qquad (22)$$

The component D of the branch metrics is a product of the branch values bv and the sampled values yn of the received signals, so that it has bad classification efficiency. However, if the plus and minus codes are neglected, the component D at the sixteen branch metrics $\lambda 1$ to $\lambda 16$ is classified into eight kinds as shown in the following formula (23).

$$D1=2\{(ynr)(\alpha 1)+(yni)(\beta 1)\}$$

$$D2=2\{(ynr)(\beta 1)-(yni)(\alpha 1)\}$$

$$D3=2\{(ynr)(\alpha 2)+(yni)(\beta 2)\}$$

$$D4=2\{(ynr)(\beta 2)-(yni)(\alpha 2)\}$$

$$D5=2\{(ynr)(\alpha 3)+(yni)(\beta 3)\}$$

$$D6=2\{(ynr)(\beta 3)-(yni)(\alpha 3)\}$$

$$D7=2\{(ynr)(\alpha 4)+(yni)(\beta 4)\}$$

$$D8=2\{(ynr)(\beta 4)-(yni)(\alpha 4)\} \qquad (23)$$

As described above, in lieu of the computation in accordance with the defining formula (18), the sixteen branch metrics $\lambda 1$ to $\lambda 16$ can be sought by seeking the representative branch values $\alpha 1$ to $\alpha 4$ and $\beta 1$ to $\beta 4$, seeking the components B, C1 to C4, and D1 to D8 of the branch metrics, and adding or subtracting the components. Where the values are thus computed, the number of operations becomes less than where computed in accordance with the definition formula, as described above. The third and fourth embodiments described in detail below are based on such a concept.

(V) Third Embodiment

Now, the branch metric computer in the adaptive maximum likelihood sequence estimator according to the third embodiment will be explained. The constitution in the adaptive maximum likelihood sequence estimator according to the third embodiment excluding the branch metric computer can be the same as the conventional and its description is omitted for the sake of simplicity.

Figure 14:
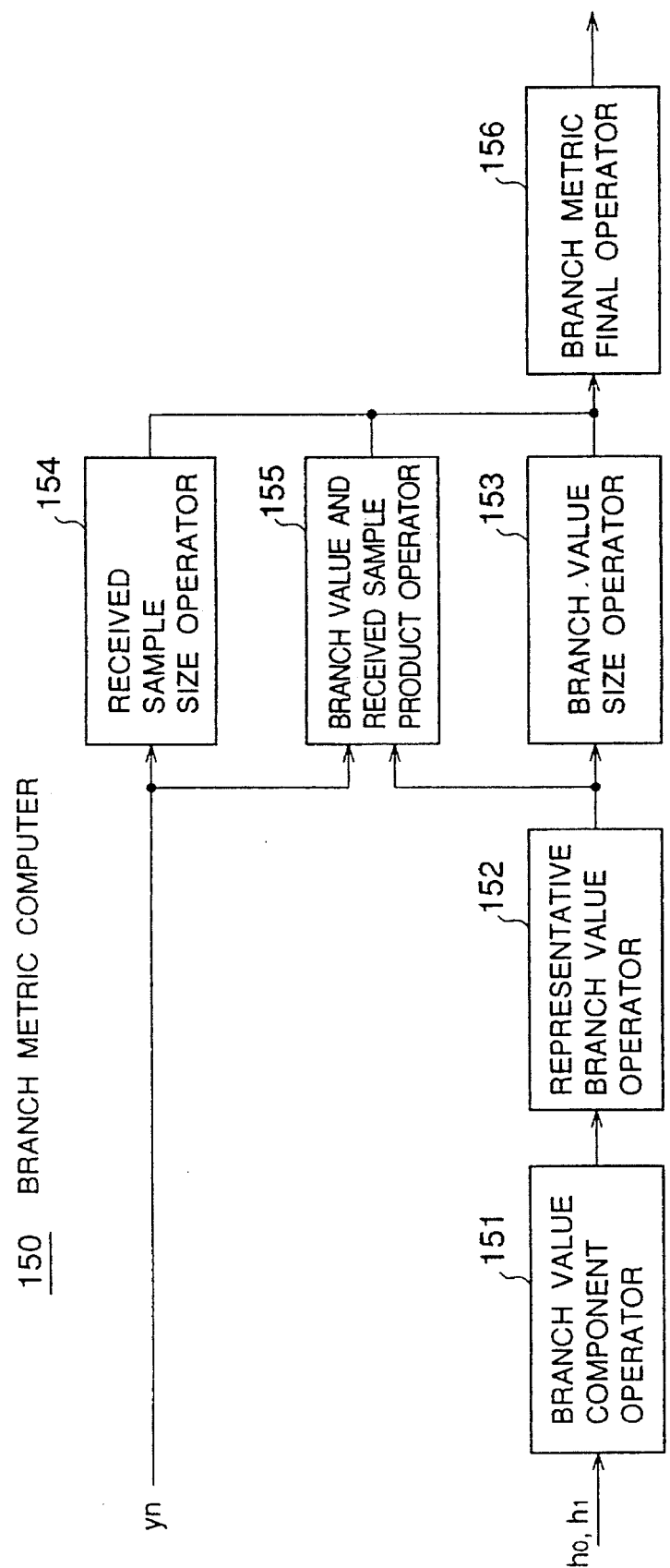
FIG. 14 is a block diagram showing a branch metric computer of an adaptive maximum likelihood sequence estimator according to the third embodiment of this invention.

FIG. 14 shows a schematic constitution of a branch metric computer 150 according to the third embodiment. The branch metric computer 150 is constituted of hardware using logical devices, and is composed of a branch value component operator 151, a representative branch value operator 152, a branch value size operator 153, a received sample size operator 154, a branch value and received sample product operator 155, and a branch metric final operator 156.

The channel estimator gives the tap coefficients h0 (=h0r+jh0i) and h1 to the branch value component operator 151. The branch value component operator 151 seeks, using the tap coefficients h0 and h1, components A(1) to A(4) of branch values in accordance with formulas (11) and (12) described above through hardware, and gives them to the representative branch value operator 152. The representative branch value operator 152 seeks, using the components A(1) to A(4) with respect to each of four combinations composed of four branches having the same phase shift amount, the real numbers $\alpha 1$ to $\alpha 4$ and the imaginary numbers $\beta 1$ to $\beta 4$ of the representative branch values through its hardware, and gives them to the branch value size operator 153 and the branch value and received sample product operator 155.

As described above, in this third embodiment, the representative branch values ($\alpha 1$ to $\alpha 4$ and $\beta 1$ to $\beta 4$) are sought after the components A(1) to A(4) of the branch values are once obtained, so that the branch value component operator 151 and the representative branch value operator 152 are respectively equivalent to the branch value component operator 71 and the representative branch value operator 72, and so that the detailed constitution is the same as shown in FIGS. 8 and 9 for the first embodiment.

The branch value size operator 153 seeks the components of the branch metrics (branch value size) C1 to C4 according to the above-described formula (22) through hardware, using the real numbers $\alpha 1$ to $\alpha 4$ and the imaginary numbers $\beta 1$ to $\beta 4$ of the representative branch values supplied from the representative branch value operator 152, and gives them to the branch metric final operator 156.

Figure 15:
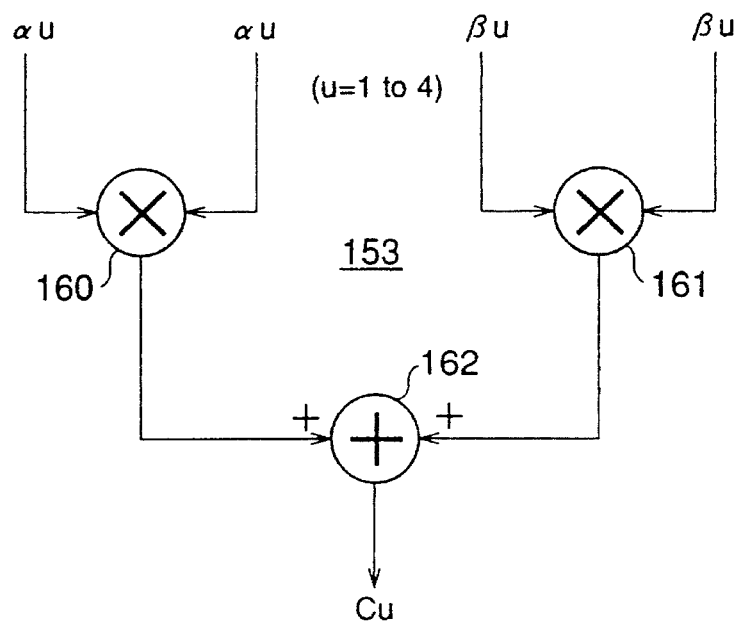
FIG. 15 is a block diagram showing a branch value size operator according to the third embodiment.

FIG. 15 shows an example of the detailed constitution of the branch value size operator 153, regarding one representative branch value ($\alpha u$, $\beta u$) (u=1 to 4). It is to be noted that registers on the input and output sides and the like are omitted from FIG. 15. In FIG. 15, the real numbers $\alpha u$ and the imaginary numbers $\beta u$ of the representative branch values are respectively squared by the corresponding multipliers 160, 161, and those squared values are added at an adder 162 to yield the component C.

The sampled values yn of the received signals at time n are supplied to the received sample size operator 154. The received sample size operator 154 seeks the component B (received sampled value size) according to the above-described formula (21) through the hardware, using the real numbers ynr and the imaginary numbers yni of the sampled value, and provides them to the branch metric final operator 156.

Figure 16:
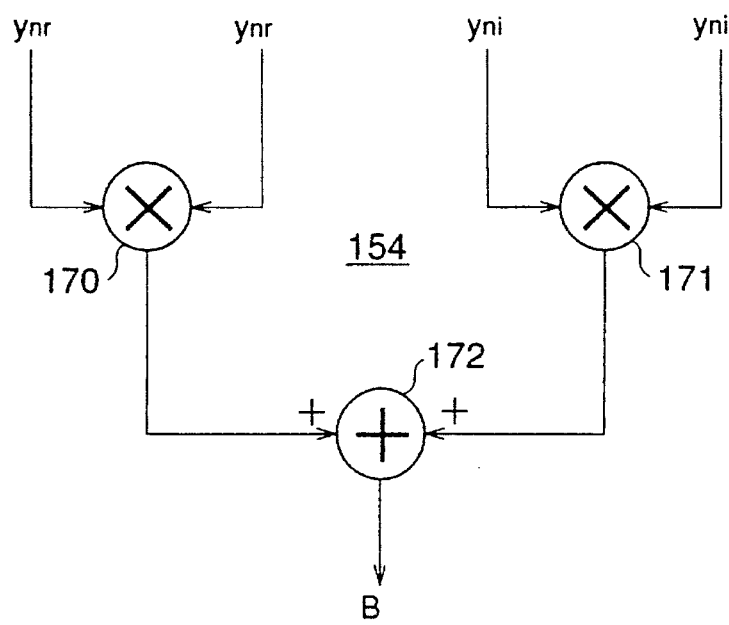
FIG. 16 is a block diagram showing a received sample size operator according to the third embodiment.

FIG. 16 shows an example of the detailed constitution of the received sample size operator 154. It is to be noted that registers on the input and output sides and the like are omitted from FIG. 16. In FIG. 16, the real number ynr and the imaginary number yni of the sampled value of each received signal are respectively squared by the corresponding multipliers 170, 171, and those squared values are added at an adder 172 to yield the component B.

The real numbers $\alpha 1$ to $\alpha 4$ and the imaginary numbers $\beta 1$ to $\beta 4$ of the representative branch values are supplied from the representative branch value operator 152 to the branch value and received sample product operator 155, and the sampled value yn of the received signal at time n are supplied thereto. The branch value and received sample product operator 155 seeks the components D1 to D8 of the branch metrics (products of the branch values and the received sampled values) according to the above-described formula (23) through the hardware, using the real numbers ynr and the imaginary numbers yni of the sampled value and the real numbers $\alpha 1$ to $\alpha 4$ and the imaginary numbers $\beta 1$ to $\beta 4$ of the representative branch values, and provides them to the branch metric final operator 156.

Figure 17:
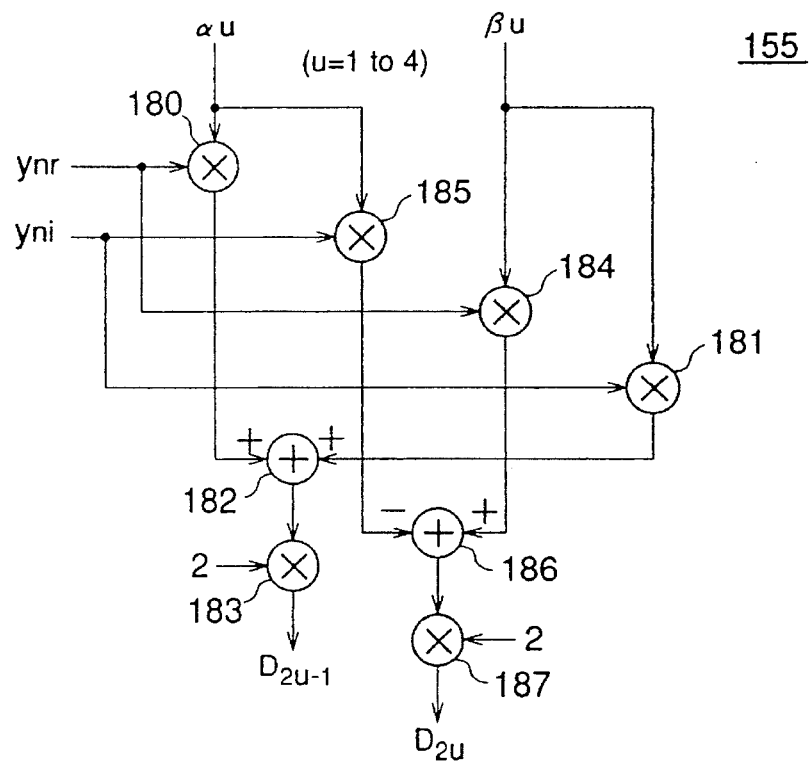
FIG. 17 is a block diagram showing a branch value and received sample product operator according to the third embodiment.

FIG. 17 shows an example of the detailed constitution of the branch value and received sample product operator 155, regarding one representative branch value ($\alpha u$, $\beta u$) (u=1 to 4). It is to be noted that registers on the input and output sides and the like are omitted from FIG. 17. In FIG. 17, the real number ynr of the sampled value of the received signal and the real number $\alpha u$ of representative branch value are multiplied by a multiplier 180, and the imaginary number yni of the sampled value of the received signals and the imaginary number $\beta u$ of representative branch value are multiplied by a multiplier 181. Those multiplied outputs are added at an adder 182, and then its output is doubled by a multiplier 183 to yield the component D2u−1. The real number ynr of the sampled value of the received signal and the imaginary number $\beta u$ of representative branch value are multiplied by a multiplier 184, and the imaginary number yni of the sampled value of the received signal and the real number $\alpha u$ of representative branch value are multiplied by a multiplier 185. After the multiplied output of the latter is subtracted from the multiplied output of the former at a subtracter 186, its output is doubled by a multiplier 187 to yield the component D2u.

The branch metric final operator 156 seeks the branch metrics $\lambda 1$ to $\lambda 16$ in accordance with the formula (20) described above using the given components B, C1 to C4, and D1 to D8, and provides them to the ACS portion (see FIG. 7) as the next stage.

Figure 18:
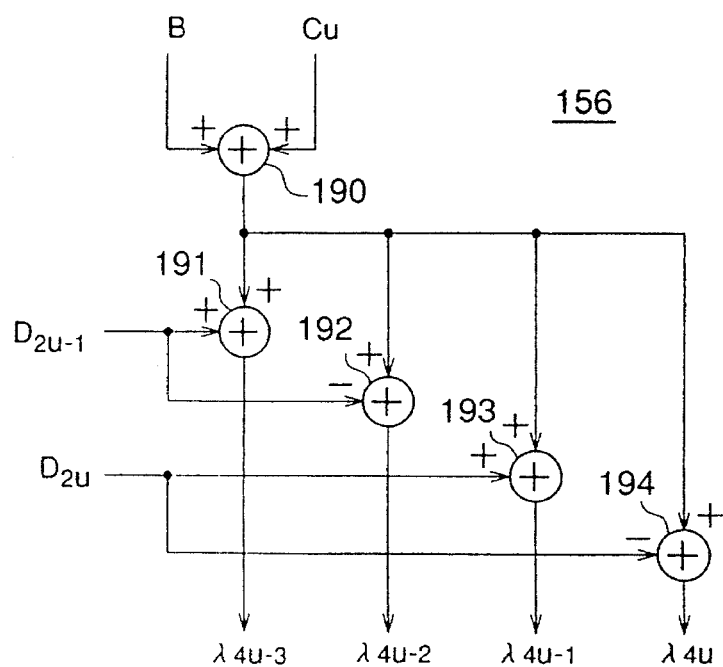
FIG. 18 is a block diagram showing a branch metric final operator according to the third embodiment.

FIG. 18 shows an example of the detailed constitution of the branch metric final operator 156, regarding one component (Cu) (u=1 to 4). It is to be noted that registers on the input and output sides and the like are omitted from FIG. 18. In FIG. 18, an adder 190 adds the component B and component Cu. An adder 191 adds the component D2u−1 to that added output to yield the branch metric $\lambda 4u-3$. A subtracter 192 subtracts the component D2u−1 from the added output to yield the branch metric $\lambda 4u-2$. An adder 193 adds the component D2u to the added output to yield the branch metric $\lambda 4u-1$. A subtracter 194 subtracts the component D2u from the added output to yield the branch metric $\lambda 4u$.

As described above, according to the third embodiment, the operation of the branch metric is not implemented as the defining formula. Since the branch metrics are sought by performing operations of the components on the branch metrics in advance and by advantageously using them, the computation results in less operations than that of the conventional, thereby simplifying the constitution and reducing power consumption as well.

Next, by comparing the third embodiment with the conventional (as well as the defining formula), up to the step of obtaining the branch metrics, the effect described above will be proven.

As described with respect to the first embodiment, 128 multiplications and 96 additions are required to obtain the branch values b1 to b16 in the conventional estimator. Where one branch metric is obtained in accordance with the defining formula (18) in which the obtained branch values are used as they are, two multiplications and three additions are required, so that 32 multiplications and 48 additions are required to achieve the sixteen branch metrics. That is, in the conventional estimator, 160 (=128+32) multiplications and 144 (=96+48) additions are required.

In contrast, where the third embodiment is used, two multiplications and ten additions are required (see FIGS. 8, 9). To obtain the component B, two multiplications and one addition are required (see FIG. 16). To obtain the components C1 to C4, eight multiplications and four additions are required (see FIG. 15). To obtain the component D1 to D8, 24 multiplications and 8 addition are required (see FIG. 17). To obtain the branch metrics from the components of three types, zero multiplications and sixteen additions are required (see FIG. 18). Accordingly, to obtain the sixteen branch metrics, 36 multiplications and 39 additions are required. That is, a method complied with the definition requires 160 multiplications, whereas the third embodiment requires 48 multiplications, and the method complying with the definition requires 144 additions, whereas the third embodiment requires 39 additions, so that the differences of those numbers of operation bring a simplified constitution and low power consumption in comparison with the conventional estimator.

(VI) Fourth Embodiment

Next, an adaptive maximum likelihood sequence estimator according to the fourth embodiment will be described. The adaptive maximum likelihood sequence estimator of the fourth embodiment performs software processing in use of a processor such as a DSP (digital signal processor) or the like.

In this fourth embodiment, the entire process to obtain the estimated value of the transmission symbol sequences X as in the case of the second embodiment described above complies with the flow chart in FIG. 12. However, its specific computation of the branch metrics is a little different from that of the conventional or the second embodiment.

Figure 19:
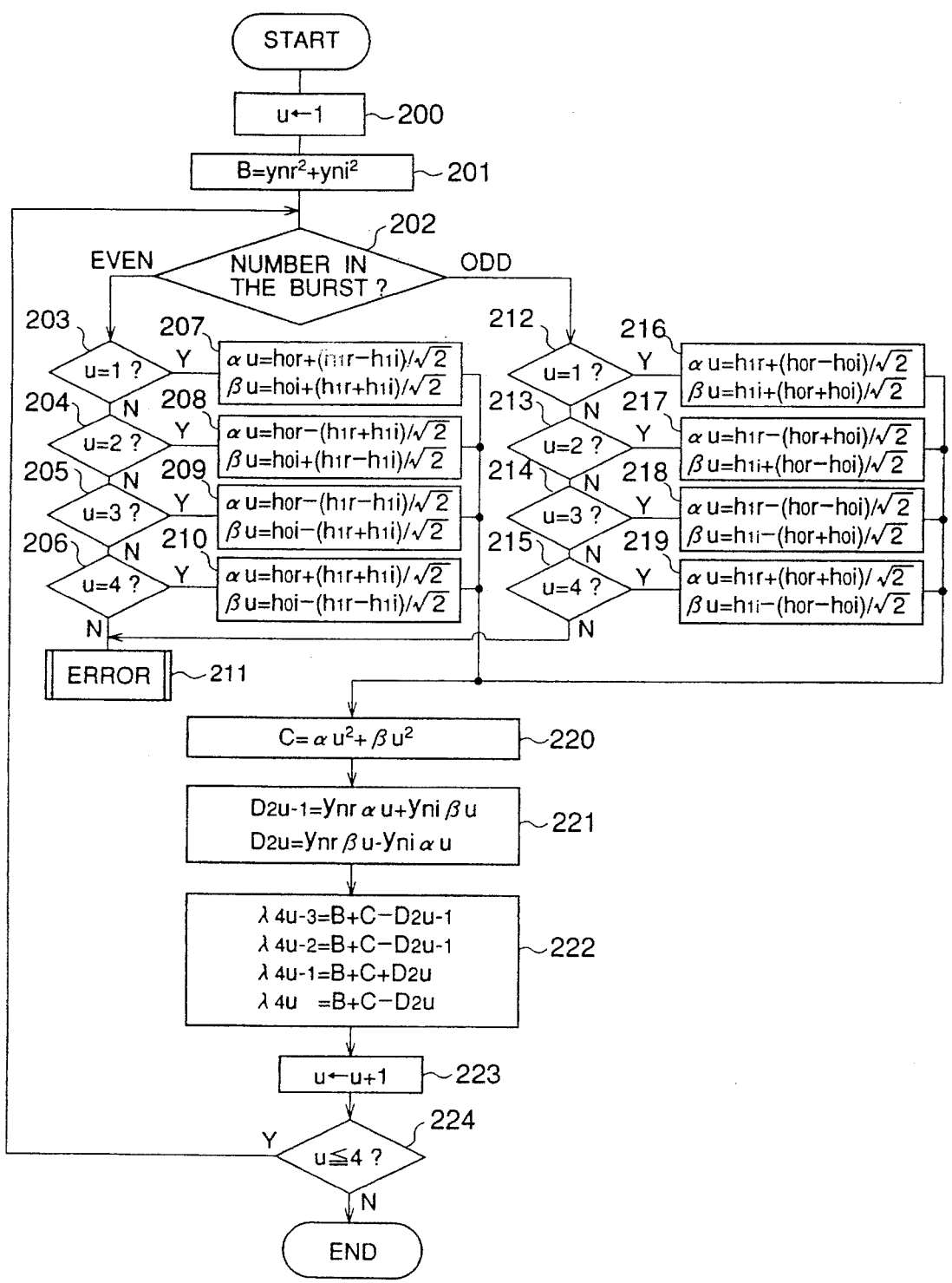
FIG. 19 is a flow chart showing a computation process of branch metrics according to the fourth embodiment of the invention.

Hereinafter, referring to the flow chart of FIG. 19, a computation of the branch metric (at step 121) according to the fourth embodiment is described in detail. It is to be noted that the fourth embodiment follows the same concept as the third embodiment.

When performing processes at time n, a phase shift amount parameter u, which determines that the phase shift amount is one of $\pi/4$ (u=1), $3\pi/4$ (u=2), $-3\pi/4$ (u=3), and $-\pi/4$ (u=4), is set to an initial value of 1 (step 200), and then, it is judged as to whether the time n (symbol to be estimated) is even or odd in the burst (step 202), after the component B (received sample size) is calculated, in accordance with the formula (21) described above, from the real number ynr and the imaginary number yni of the sampled value of the received signal (step 201).

If it is even, with confirmation of the value of the phase shift amount parameter u at that time (steps 203 to 206), the representative branch values having the confirmed phase shift amount are computed (steps 207 to 210). Where it is even, the representative branch values $\alpha u$, $\beta u$ are computed in accordance with the formula (16). If an impossible value is determined at the confirmation of the value of the phase shift amount parameter u, an error process is implemented (step 211).

Similarly, if it is odd, with confirmation of the value of the phase shift amount parameter u at that time (steps 212 to 215), the representative branch values having the confirmed phase shift amount are computed (steps 216 to 219). Where it is even, the representative branch values $\alpha u$, $\beta u$ are computed in accordance with an operational formula replacing h0r in the formula (16) with h1r, replacing h0i with h1i, replacing h1r with h0r, and replacing h1i with h0i. Even if it is odd, and if the impossible value is judged at the confirmation of the value of the phase shift amount parameter u, an error process is implemented (step 211).

Next, using the representative branch values $\alpha u$ (=bvr), $\beta u$ (=bvi) thus sought, the component (branch value size) C is calculated in accordance with the formula (21) described above (step 220). In addition, the components (branch value and received sample products) D2u−1, D2u are calculated in accordance with the formula (21) described above (step 221). Specifically, the following formula (24) is computed.

$$D2u-1 = ynr \cdot \alpha u + yni \cdot \beta u$$

$$D2u = ynr \cdot \alpha u - yni \cdot \beta u \quad (24)$$

The branch metrics $\lambda 4u-3$, $\lambda 4u-2$, $\lambda 4u-1$, $\lambda 4u$ regarding to the four branches of the phase shift amount in association with the phase shift amount parameter u at that time are determined in accordance with the formula (20) from the sought components B, C, D2u−1, D2u (step 222). Specifically, the operations shown in the following formula (25) are performed.

$$\lambda 4u-3 = B+C+D2u-1$$

$$\lambda 4u-2 = B+C-D2u-1$$

$$\lambda 4u-1 = B+C+D2u$$

$$\lambda 4u = B+C-D2u \quad (25)$$

Where computations of the branch metrics for the four branches corresponding to the phase shift amount determined by the phase shift amount parameter u at that time are thus finished, after increment by one of the phase shift amount parameter u (step 223), the phase shift amount parameter u is compared with 4, the possible largest number, and thereby it is confirmed whether all sixteen branch metrics are computed (step 224). If the computation of all branch metrics has not been finished yet, the process returns to step 202 as described above. If the computation of all branch metrics has already been finished, the obtained sixteen branch metrics are transferred to the process at step 122 in FIG. 12 as described above, to end the successive processes.

There are the same relations of number of times as described in the third embodiment between the number of of additions and multiplications of the fourth embodiment and the number of of additions and multiplications of the conventional one performing software processing. Accordingly, the fourth embodiment can reduce the number of operations in comparison with the conventional and grossly shorten the processing time for seeking the branch metrics in comparison with the conventional.

(VII) Applicability of This Invention to the Symbols of QPSK modulation Methods Although, in the first to fourth embodiments, the method whose symbols are comply with the π/4 shift DQPSK modulation method is shown, this invention is applicable to the symbol sequences in compliance with other modulation methods. In summary, methods such that the symbols are periodically arrayed on a signal-space diagram would be enough, and for example, the QPSK modulation method, the QAM modulation method, or the like can be performed.

Hereinafter, although the description for its constitution and processing is omitted, we will briefly explain that this invention is applicable to the symbols for the QPSK modulation method. In particular, it is possible to implement the same concept as the basic concept of the first and second embodiments capable of effectively seeking the branch value. It is to be noted that, as a transmission channel, the two wave model of the white gaussian noise as well as the embodiments above is supposed.

Figure 20:
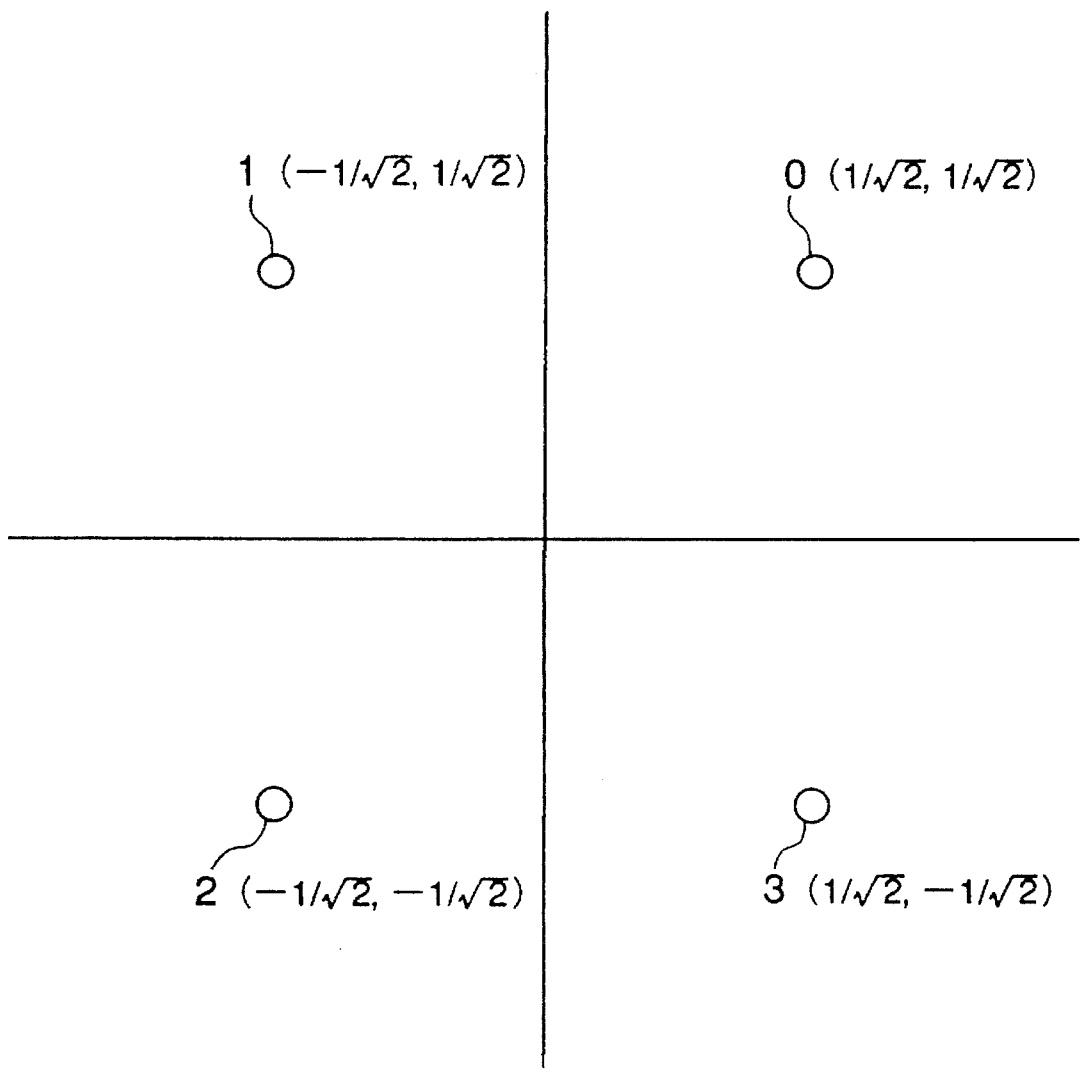
FIG. 20 is a signal-space diagram showing a QPSK modulation method.

As shown in FIG. 20, a signal-space diagram (coded alphabet), the symbols of the QPS modulation method are arrayed periodically. Sixteen branch values bst (s is 0 to 3; t is 0 to 3) are fully expressed, as shown in the formula (27), by the four components A(1) to A(4) (combination value of the tap coefficients) shown in the following formula (26).

$$A(1) = 0.707 \ (h04 - h01)$$
$$A(2) = 0.707 \ (h0r + h0i)$$
$$A(3) = 0.707 \ (h1r + h1i)$$
$$A(4) = 0.707 \ (h1r - h1i) \ldots (26)$$

| | |
|---|---|
| b00r = A(1) + A(4) | b00i = A(2) + A(3) |
| b01r = A(1) − A(3) | b01i = A(2) − A(4) |
| b02r = A(1) − A(3) | b02i = A(2) − A(3) |
| b03r = A(1) + A(3) | b03i = A(2) + A(4) |
| b10r = −A(2) + A(4) | b10i = −A(1) + A(3) |
| b11r = −A(2) − A(3) | b11i = −A(1) − A(4) |
| b12r = −A(2) − A(4) | b12i = −A(2) − A(3) |
| b13r = −A(2) + A(3) | b13i = −A(1) + A(4) |
| b20r = −A(1) + A(4) | b20i = −A(2) + A(3) |
| b21r = −A(1) − A(3) | b21i = −A(2) − A(4) |
| b22r = −A(1) − A(4) | b22i = −A(2) − A(3) |
| b23r = −A(1) + A(3) | b23i = −A(1) + A(4) |
| b30r = A(2) + A(4) | b30i = A(1) + A(3) |
| b31r = A(2) − A(3) | b31i = A(1) − A(4) |
| b32r = A(2) − A(4) | b32i = A(1) − A(3) |
| b33r = A(2) + A(4) | b33i = A(1) + A(4) … (27) |

Here, four branches having the same phase shift amount, for instance, b00, b11, b22, and b33, have relations indicated in the following formula (28).

$$b00r = A(1) + A(4) = \alpha$$
$$b00i = A(2) + A(3) = \beta$$
$$b11r = -A(2) - A(3) = -\beta$$
$$b11i = -A(1) - A(4) = -\alpha$$
$$b22r = -A(1) - A(4) = -\alpha$$
$$b22i = -A(2) - A(3) = -\beta$$
$$b33r = A(2) + A(3) = \beta$$
$$b33i = A(1) + A(4) = \alpha \quad (28)$$

For example, if the branch value b00 is sought, other branch values b11, b22, b33 can be sought using the found branch value (α, β).

As apparent from the description above, the concept employed in the first and second embodiments is applicable to the symbols in accordance with the QPSK modulation method, as well as the case of the symbols in accordance with the π/4 shift DQPSK modulation method. Although a description is omitted, as assumed from the description above, the concept employed in the third and fourth embodiments is applicable to the symbols in accordance with the QPSK modulation method, as well as the case of the symbols in accordance with the π/4 shift DQPSK modulation method.

(VIII) Other Embodiments

We described that the modulation method is not limited to ones described above, and in addition to this point, this invention permits modifications other than the embodiments described above. Although in the first to fourth embodiments the two wave model is supposedly provided as a transmission channel, this invention is applicable to an adaptive maximum likelihood sequence estimator in which three or more wave model is supposedly applied. Although in the second and fourth embodiments all process are implemented through the software, as the adaptive maximum likelihood sequence estimator, it is allowable to have at least the branch metric process implemented through the software. Moreover, although the embodiments above are described to be applied to land digital mobile radio communications as a premise, this invention may be applicable to a system whose channel is formed by a cable, and to systems having a widely defined transmission channel such that recording media is used for recording and playing.

As described above, according to the invention, regarding computation at the branch metric computer, in association with the regularity of the coded alphabets of the transmission symbols, common operational elements, which commonly appear where all branch metrics are to be computed, are computed, and using this method, all branch metrics are computed and sought, so that the number of operations to obtain the branch metrics can be less than the conventional one. Consequently, where the branch metric computer is constituted of hardware, the estimator is simply constituted and can reduce its power consumption. Where the branch metric computer is constituted of software, its processing time can be shortened.

It is understood that although the present invention has been described in detail with respect to preferred embodiments thereof, various other embodiments and variations are possible to those skilled in the art which fall within the scope and spirit of the invention, and such other embodiments and variations are intended to be covered by the following claims.

What is claimed is:

1. An adaptive maximum likelihood sequence estimator comprising:

a transmission channel estimator for estimating, using partial sequences of sampled values of received signals and using estimated values of parts of sequences of transmission symbols, the impulse response of a transmission channel; and a Viterbi algorithm processor for sequentially estimating the sequences of transmission symbols from the estimated impulse response of the transmission channel and the partial sequences of sampled values, said Viterbi algorithm processor including a branch metric computer, an addition-comparison-selection portion, a path metric memory, and a path history memory;

said branch metric computer including common element operation means for computing operational common elements which commonly appear in computations of plural branch values when all branch values for connecting between states are to be computed, in association with a regularity of coded alphabets of transmission symbols, branch value producing means for producing all branch values from the computed common elements, and branch metric final operation means for computing all branch metrics from the produced branch values.

2. An adaptive maximum likelihood sequence estimator as set forth in claim 1, wherein the transmission symbols are distinguished by phase modulation, and wherein each of the operational common elements is one of a group of the branch values of a combination composed of plural branches having the same phase shift amount.

3. An adaptive maximum likelihood sequence estimator as set forth in claim 1, wherein the branch value producing means produces a predetermined number F of complex branch values, each having a real part and an imaginary part, the real part and the imaginary part of each complex branch value including a respective linear combination of at least two of the common elements.

4. An adaptive maximum likelihood sequence estimator as set forth in claim 3, wherein each of the linear combinations of the common elements that form the respective real and imaginary parts of the respective branch values, have the form $aA_f+bA_g$ where a and b are +1 or −1, and $A_f$ and $A_g$ are two different common elements selected from the group of common elements $\{A_t\}$, t=1 to F.

5. An adaptive maximum likelihood sequence estimator as set forth in claim 1, wherein the transmission symbols estimated by the Viterbi algorithm processor are, at any given time, representable in a signal space diagram by one of four distinct states, wherein the branch values are complex branch values, and wherein the common element operation means produces, among the common elements, four components, such that sixteen different linear combinations of the four components, each comprised of two of the four components, form real and imaginary parts of the complex branch values for connecting between the states of successive transmission symbols of the sequence of transmission symbols.

6. An adaptive maximum likelihood sequence estimator as set forth in claim 5, wherein, representing the impulse response of the transmission channel by first and second complex impulse response coefficients corresponding to first and second times, the four components include a first component given by the real part of the first coefficient, a second component given by the imaginary part of the first coefficient, a third component given by 0.707 times the sum of the real and imaginary parts of the second coefficient, and a fourth component given by 0.707 times the difference between the real and imaginary parts of the second coefficient.

7. An adaptive maximum likelihood sequence estimator comprising:

a transmission channel estimator for estimating, using partial sequences of sampled values of received signals and using estimated values of parts of sequences of transmission symbols, the impulse response of a transmission channel; and a Viterbi algorithm processor for sequentially estimating the sequences of transmission symbols from the estimated impulse response of the transmission channel and the partial sequences of sampled values, said Viterbi algorithm processor including a branch metric computer, an addition-comparison-selection portion, a path metric memory, and a path history memory;

wherein said branch metric computer computes, in association with a regularity of coded alphabets of transmission symbols, operational common elements that commonly appear in computations of plural branch values when all branch values for connecting between states are to be computed, produces all branch values from the computed common elements, and computes all branch metrics from produced branch values.

8. An adaptive maximum likelihood sequence estimator as set forth in claim 7, wherein the transmission symbols are distinguished by phase modulation, and wherein each of the operational common elements is one of a respective group of the branch values of a combination composed of plural branches having the same phase shift amount.

9. An adaptive maximum likelihood sequence estimator as set forth in claim 7, wherein the branch metric computer produces as the branch values a predetermined number F of complex branch values, each having a real part and an imaginary part, the real part and the imaginary part of each complex branch value including a respective linear combination of at least two of the common elements.

10. An adaptive maximum likelihood sequence estimator as set forth in claim 9, wherein each of the linear combinations of the common elements that form the respective real and imaginary parts of the respective branch values, have the form $aA_f+bA_g$ where a and b are +1 or −1, and $A_f$ and $A_g$ are two different common elements selected from the group of common elements $\{A_t\}$, t=1 to F.

11. An adaptive maximum likelihood sequence estimator as set forth in claim 7, wherein the transmission symbols estimated by the Viterbi algorithm processor are, at any given time, representable in a signal space diagram by one of four distinct states, and wherein the branch metric computer produces, among the common elements, four components, such that sixteen different linear combinations of the four components, each comprised of two of the four components, form real and imaginary parts of complex branch values for connecting between the states of successive transmission symbols of the sequence of transmission symbols.

12. An adaptive maximum likelihood sequence estimator as set forth in claim 11, wherein, representing the impulse response of the transmission channel by first and second complex impulse response coefficients corresponding to first and second times, the four components include a first component given by the real part of the first coefficient, a second component given by the imaginary part of the first coefficient, a third component given by 0.707 times the sum of the real and imaginary parts of the second coefficient, and a fourth component given by 0.707 times the difference between the real and imaginary parts of the second coefficient.

13. An adaptive maximum likelihood sequence estimator comprising:

a transmission channel estimator for estimating, using partial sequences of sampled values of received signals and using estimated values of parts of sequences of transmission symbols, the impulse response of a transmission channel; and a Viterbi algorithm processor for sequentially estimating the sequences of transmission symbols from the estimated impulse response of the transmission channel and the partial sequences of sampled values, said Viterbi algorithm processor including a branch metric computer, an addition-comparison-selection portion, a path metric memory, and a path history memory;

said branch metric computer including common element operation means for computing one or more kinds of operational common elements which commonly appear in computations of plural branch metrics when branch metrics of all branches for connecting between states are to be computed, in association with a regularity of coded alphabets of transmission symbols, and branch metric final operation means for computing all branch metrics from the computed common elements.

14. An adaptive maximum likelihood sequence estimator as set forth in claim 13, wherein the transmission symbols are distinguished by phase modulation, and wherein the operational common elements include size of one of branch values of a respective group of the plural branches having the same phase shift amount, size of sampled values of the received signals, and a product of one branch value of a combination composed of plural branches having the same phase shift amount and sampled values of the received signals.

15. An adaptive maximum likelihood sequence estimator as set forth in claim 13, wherein the common element operation means produces among the common elements a predetermined number of components, different respective linear combinations of which form real and imaginary parts of complex branch values for connecting between the states.

16. An adaptive maximum likelihood sequence estimator as set forth in claim 15, wherein each of the linear combinations of the common elements that form the respective real and imaginary part of the respective branch values, have the form $aA_f+bA_g$ where a and b are +1 or −1, and $A_f$ and $A_g$ are two different common elements selected from the group of common elements $\{A_t\}$, t=1 to F, F being a whole number greater than one.

17. An adaptive maximum likelihood sequence estimator as set forth in claim 13, wherein the transmission symbols estimated by the Viterbi algorithm processor are, at any given time, representable in a signal space diagram by one of four distinct states, and wherein the branch metric computer produces, among the common elements, four components, such that sixteen different linear combinations of the four components, each comprised of two of the four components, form real and imaginary parts of complex branch values for connecting between the states of successive transmission symbols of the sequence of transmission symbols.

18. An adaptive maximum likelihood sequence estimator as set forth in claim 17, wherein, representing the impulse response of the transmission channel by first and second complex impulse response coefficients corresponding to first and second times, the four components include a first component given by the real part of the first coefficient, a second component given by the imaginary part of the first coefficient, a third component given by 0.707 times the sum of the real and imaginary parts of the second coefficient, and a fourth component given by 0.707 times the difference between the real and imaginary parts of the second coefficient.

19. An adaptive maximum likelihood sequence estimator comprising:

a transmission channel estimator for estimating, using partial sequences of sampled values of received signals and using estimated values of parts of sequences of transmission symbols, the impulse response of a transmission channel; and a Viterbi algorithm processor for sequentially estimating the sequences of transmission symbols from the estimated impulse response of the transmission channel and the partial sequences of sampled values, said Viterbi algorithm processor including a branch metric computer, an addition-comparison-selection portion, a path metric memory, and a path history memory;

wherein said branch metric computer computes, in association with a regularity of coded alphabets of transmission symbols, one or more kinds of operational common elements that commonly appear in computations of plural branch metrics when branch metrics of all branches for connecting between states are to be computed, and computes all branch metrics from the computed common elements.

20. An adaptive maximum likelihood sequence estimator as set forth in claim 19, wherein the transmission symbols are distinguished by phase modulation, and wherein the operational common elements include size of one of branch values of a combination composed of plural branches having the same phase shift amount, size of sampled values of the received signals, and a product of one branch value of a combination composed of plural branches having the same phase shift amount and sampled values of the received signals.

21. An adaptive maximum likelihood sequence estimator as set forth in claim 19, wherein the branch metric computer produces among the common elements a predetermined number of components, different respective linear combinations of which form real and imaginary parts of complex branch values for connecting between the states.

22. An adaptive maximum likelihood sequence estimator as set forth in claim 21, wherein each of the linear combinations of the common elements that form the respective real and imaginary parts of the respective branch values, have the form $aA_f+bA_g$ where a and b are +1 or −1, and $A_f$ and $A_g$ are two different common elements selected from the group of common elements $\{A_t\}$, t=1 to F, F being a whole number greater than one.

23. An adaptive maximum likelihood sequence estimator as set forth in claim 19, wherein the transmission symbols estimated by the Viterbi algorithm processor are, at any given time, representable in a signal space diagram by one of four distinct states, and wherein the branch metric computer produces, among the common elements, four components, such that sixteen different linear combinations of the four components, each comprised of two of the four components, form real and imaginary parts of complex branch values for connecting between the states of successive transmission symbols of the sequence of transmission symbols.

24. An adaptive maximum likelihood sequence estimator as set forth in claim 23, wherein, representing the impulse response of the transmission channel by first and second complex impulse response coefficients corresponding to first and second times, the four components include a first component given by the real part of the first coefficient, a second component given by the imaginary part of the first coefficient, a third component given by 0.707 times the sum of the real and imaginary parts of the second coefficient, and a fourth component given by 0.707 times the difference between the real and imaginary parts of the second coefficient.

* * * * *